United States Patent
Nishikawa et al.

(10) Patent No.: US 10,367,375 B2
(45) Date of Patent: Jul. 30, 2019

(54) POWER SUPPLY APPARATUS

(71) Applicant: Funai Electric Co., Ltd., Osaka (JP)

(72) Inventors: Takafumi Nishikawa, Osaka (JP); Naoyuki Wakabayashi, Osaka (JP); Yuzuru Hashimoto, Osaka (JP)

(73) Assignee: Funai Electric Co., LTD., Osaka (JP)

( * ) Notice: Subject to any disclaimer, the term of this patent is extended or adjusted under 35 U.S.C. 154(b) by 188 days.

(21) Appl. No.: 15/246,612

(22) Filed: Aug. 25, 2016

(65) Prior Publication Data

US 2017/0063162 A1     Mar. 2, 2017

(30) Foreign Application Priority Data

Aug. 25, 2015  (JP) ................................. 2015-165959
Nov. 16, 2015  (JP) ................................. 2015-223650

(51) Int. Cl.
| | |
|---|---|
| *H01F 38/00* | (2006.01) |
| *H01F 27/42* | (2006.01) |
| *H02J 50/12* | (2016.01) |
| *H02J 50/40* | (2016.01) |
| *H02J 50/80* | (2016.01) |
| *H02J 50/90* | (2016.01) |
| *H02J 7/02* | (2016.01) |

(52) U.S. Cl.
CPC .............. *H02J 50/12* (2016.02); *H02J 7/025* (2013.01); *H02J 50/40* (2016.02); *H02J 50/80* (2016.02); *H02J 50/90* (2016.02)

(58) Field of Classification Search
USPC ......................................................... 307/104
See application file for complete search history.

(56) References Cited

U.S. PATENT DOCUMENTS 9,467,008 B2 * 10/2016 Sankar .................... H02J 17/00
2016/0149435 A1    5/2016 Nago

FOREIGN PATENT DOCUMENTS

| EP | 2800240 A1 | 11/2014 |
|---|---|---|
| JP | 2015-008619 A | 1/2015 |
| WO | 2015/019560 A1 | 2/2015 |

OTHER PUBLICATIONS

Extended European Search Report issued in corresponding European Application No. 16185672.9 dated Dec. 14, 2016 (8 pages).
Office Action issued in Chinese Application No. 201610726012.1, dated Mar. 11, 2019 (6 pages).

* cited by examiner

*Primary Examiner* — Rexford N Barnie
*Assistant Examiner* — Dru Parries
(74) *Attorney, Agent, or Firm* — Osha Liang LLP

(57) ABSTRACT

A power supply apparatus includes a power supply unit that supplies power from a power source to a power receiving apparatus, a power acquisition unit that acquires a power value of power from the power source upon detecting another power receiving apparatus, and a controller that determines whether to supply the power from the power source to the another power receiving apparatus based on the power value.

15 Claims, 24 Drawing Sheets

FIG.6

| Identification information | Measurement value [Ω] |
|---|---|
| ID1, ID2 | Z1 |
| ID1 (second time), ID2 | Z2 |
| ID1 (second time), ID3 | Z3 |
| ID1 (second time), ID2, | Z4 |

| Identification information | Measurement value [W] |
|---|---|
| ID1, ID2 | Z1 |
| ID1 (second time), ID2 | Z2 |

706a

FIG. 18A  Gate drive signal
(drive frequency fd)
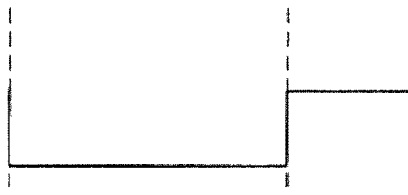
FIG. 18B  Voltage value V3 of switching element
(resonant frequency fr = 1.5×fd)
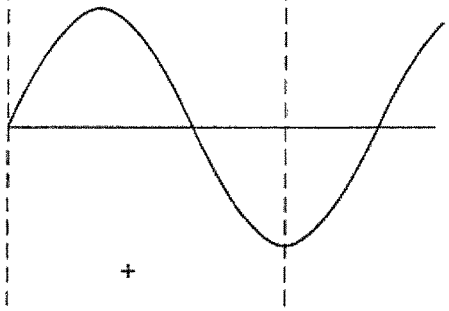
FIG. 18C  Voltage charged in parasitic capacitance C1
(resonant frequency fr)
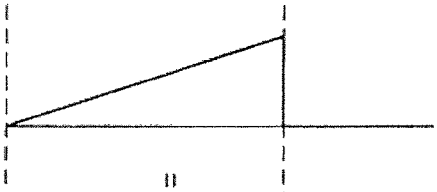
FIG. 18D  Ideal waveform of voltage value V3
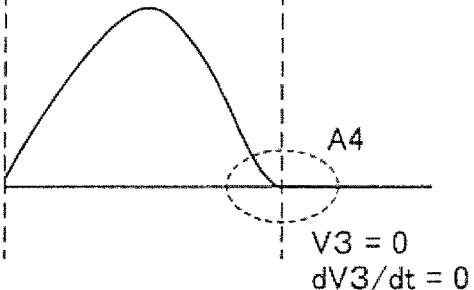
$V3 = 0$
$dV3/dt = 0$

POWER SUPPLY APPARATUS

TECHNICAL FIELD

The present invention generally relates to a power supply apparatus, and particularly relates to a power supply apparatus comprising a communication unit.

BACKGROUND

Conventional power supply apparatuses comprise a communication unit (for example, see patent literature 1).

Patent literature 1 discloses a wireless power transmission system comprising a communication unit. This wireless power transmission system includes a power sending apparatus and a power receiving apparatus. The communication unit is provided respectively to the power sending apparatus and the power receiving apparatus and performs wireless communication according to a predetermined standard. Moreover, the power receiving apparatus decreases a load to decrease a size of received power when authentication by the power sending apparatus is performed. Moreover, the power receiving apparatus increases the load to increase the size of the received power in a situation where authentication succeeds.

Furthermore, another conventional power supply apparatus comprise a communication unit.

This power supply apparatus comprising a communication unit has a class set according to power that the power supply apparatus can supply according to a predetermined standard (for example, the A4WP (Alliance for Wireless Power) standard). Moreover, similarly to the power supply apparatus, a power receiving apparatus that receives the power from this power supply apparatus also has a category set according to power that the power receiving apparatus consumes according to a predetermined standard (for example, the A4WP standard). Moreover, the power supply apparatus acquires information on the category from the power receiving apparatus via the communication unit and determine whether to feed the power receiving apparatus based on the acquired category and the class of the power supply apparatus.

CITATION LIST

Patent Literature

[Patent Literature 1] Japanese Patent Application Publication No. 2015-8619

However, with the wireless power transmission system of patent literature 1 above, the power receiving apparatus is fed only in the situation where authentication by the power sending apparatus succeeds. Here, it is thought that the power sending apparatus acquires the information on the category from the power receiving apparatus via the communication unit when performing authentication of the power receiving apparatus and determine whether to cause authentication to succeed (whether to feed) based on the acquired information on the category and information on the class. Because of this, it is thought that the power sending apparatus of patent literature 1 above intentionally fails the authentication of the power receiving apparatus (in other words, the power sending apparatus does not feed power) based on the category even in a situation where there is excess power that can be supplied in a situation where feeding is actually performed. Therefore, with the wireless power transmission system of patent literature 1 above, it is thought that there is a situation where the power receiving apparatus cannot be fed even in a situation where there is an excess in the power that the power sending apparatus (power supply apparatus) can feed. As a result, in the wireless power transmission system of patent literature 1 above, it may be difficult to feed more power receiving apparatuses.

SUMMARY OF THE INVENTION

A power supply apparatus and a power supply method according to one or more embodiments of the present invention can feed more power receiving apparatuses.

A power supply apparatus according to one or more embodiments of the present invention may comprise: a power source; a power supply antenna that supplies power from the power source to a power receiving apparatus; a power acquisition unit that acquires a power value of the power of the power; a communication unit that communicates with the power receiving apparatus; and a controller that sends a load disconnect signal via the communication unit to the power receiving apparatus supplied with power, acquires a power value after sending the load disconnect signal, and determines whether to feed a new power receiving apparatus based on the acquired power value.

In the power supply apparatus according to one or more embodiments of the present invention, as above, the controller sends the load disconnect signal via the communication unit to the power receiving apparatus supplied with power, acquire the power value after sending the load disconnect signal, and determine whether to feed the new power receiving apparatus based on the acquired power value. By this, the actual power fed to the new power receiving apparatus is acquired and it can be determined whether to feed the new power receiving apparatus based on the actual power. As a result, because this is based on the actual power, unlike a situation of determining whether to feed the new power receiving apparatus using simply a category of the new power receiving apparatus, being determined to not feed the new power receiving apparatus can be suppressed even in a situation where there is an excess in the power that can be fed. Moreover, by sending the load disconnect signal to the power receiving apparatus supplied with power, entering a state where fed power becomes insufficient can be suppressed when the power is acquired by supplying power to the new power receiving apparatus. As a result, an opportunity to feed the new power receiving apparatus can be ensured more reliably. As a result, more power receiving apparatuses can be fed.

In the power supply apparatus according to one or more embodiments of the present invention, the power supply antenna supplies power to a plurality of power receiving apparatuses, and the controller acquires power category information from the new power receiving apparatus, send the load disconnect signal to at least one power receiving apparatus among the plurality of power receiving apparatuses, and stop supply of power at or above a power amount corresponding to the power category information. As a result, entering the state where fed power becomes insufficient can be suppressed more reliably because supply of power at or above the power amount corresponding to the power category information stops when the power is acquired by supplying power to the new power receiving apparatus.

In the power supply apparatus according to one or more embodiments of the present invention, the controller sends the load disconnect signal to all the plurality of power receiving apparatuses supplied with power and acquire the power value of the power by supplying power to the new power receiving apparatus. As a result, control processing can be simplified compared to a situation of selecting a portion of the plurality of power receiving apparatuses supplied with power and sending the load disconnect signal, and entering the state where fed power becomes insufficient when the power value is acquired by supplying power to the new power receiving apparatus can be further suppressed.

In the power supply apparatus according to one or more embodiments of the present invention, the controller sends a maximum load command signal, which commands operating by a maximum load, to the new power receiving apparatus and at least one of the power receiving apparatuses supplied with power and determine whether to feed the new power receiving apparatus based on the acquired power value. As a result, the power fed to the power receiving apparatus to which the maximum load command signal is sent corresponds to a maximum value of the power actually fed to the power supply apparatus; therefore, it can be determined whether to feed the power receiving apparatus based on the maximum value of the power actually fed to the power receiving apparatus without using the category of the power receiving apparatus. As a result, entering the state where the fed power becomes insufficient can be suppressed even in a situation where the load of the power receiving apparatus is maximized.

In this situation, the power supply antenna is able to supply power to the plurality of power receiving apparatuses, and the controller respectively sends the maximum load command signal to the new power receiving apparatus and the plurality of power receiving apparatuses supplied with power, respectively acquire a power value the power fed to the power receiving apparatuses to which the maximum load command signal is sent, and determine whether to feed the new power receiving apparatus based on the acquired power value. As a result, entering the state where fed power becomes insufficient can be suppressed even in a situation where the load of any power receiving apparatus is maximized because the determination whether to feed is respectively performed for the plurality of power receiving apparatuses.

In the power supply apparatus above that sends the maximum load command signal to the respective power receiving apparatuses, the controller respectively acquires a power value of the power fed to the power receiving apparatuses to which the maximum load command signal is sent and perform a control of feeding the new power receiving apparatus and the power receiving apparatuses supplied with power in a situation where a total value of the acquired power value is at or below a maximum feeding power, which is a maximum value of power that can be supplied from the power source. As a result, the determination whether to feed can be performed easily even in a situation of feeding the plurality of power receiving apparatuses by comparing the total value of the acquired power value and the maximum feeding power value.

In the power supply apparatus above that sends the maximum load command signal to the respective power receiving apparatuses, the controller respectively and sequentially sends the maximum load command signal to the new power receiving apparatus and the plurality of power receiving apparatuses supplied with power and respectively and sequentially acquire the power value of the power corresponding to the new power receiving apparatus and the plurality of power receiving apparatuses supplied with power. As a result, unlike a situation of simultaneously acquiring all the power value of the power corresponding to the plurality of power receiving apparatuses, the total value of the acquired power value can be acquired easily even in a situation where the total value of the acquired power value exceeds the maximum feeding power.

In the power supply apparatus above that sends the maximum load command signal to the power receiving apparatus, the controller acquires identification information from the new power receiving apparatus via the communication unit and perform a control of feeding the new power receiving apparatus without sending the maximum load command signal to the new power receiving apparatus in a situation where the identification information acquired from the new power receiving apparatus is identical to identification information acquired in advance. As a result, after the power receiving apparatus is temporarily removed from the power supply apparatus and feeding is temporarily stopped, feeding can be restarted without performing the determination whether to feed by determining based on the identification information in a situation where the same power receiving apparatus is again disposed on the power supply apparatus. That is, feeding the power receiving apparatus can be restarted speedily to an extent that the determination whether to feed does not need to be performed.

In this situation, further provided is: an impedance measurement unit that measures an impedance of the power supply antenna; wherein the controller sends the maximum load command signal to the new power receiving apparatus in a situation where the identification information acquired from the new power receiving apparatus is identical to the identification information acquired in advance and a situation where a change amount of a measurement value of the impedance corresponding to the identification information acquired from the new power receiving apparatus relative to a measurement value of the impedance corresponding to the identification information acquired in advance is greater than a first threshold. As a result, after the power receiving apparatus is temporarily removed from the power supply apparatus and feeding is temporarily stopped, it can be determined appropriately whether feeding is possible even in a situation where a placement or the like changes and a coupling coefficient (feeding efficiency) changes in a situation where the same power receiving apparatus is again disposed on the power supply apparatus.

The power supply apparatus above comprising the impedance measurement unit, further comprises: a notification unit that notifies information to a user; wherein the controller controls the notification unit to notify a request to the user to correct the placement of the new power receiving apparatus in the situation where the identification information acquired from the new power receiving apparatus is identical to the identification information acquired in advance and a situation where an increase amount of the measurement value of the impedance corresponding to the identification information acquired from the new power receiving apparatus relative to the measurement value of the impedance corresponding to the identification information acquired in advance is at or above a second threshold. As a result, the user can be notified by the notification unit to correct the placement even in a situation where the placement or the like changes and the coupling coefficient (feeding efficiency) changes in the situation where after the power receiving apparatus is temporarily removed from the power supply apparatus and feeding is temporarily stopped the power receiving apparatus is again disposed on the power supply apparatus. By this, feeding can be performed with high efficiency.

In the power supply apparatus above that acquires the identification information from the power receiving apparatus, the controller sends the maximum load command signal to the new power receiving apparatus in the situation where the identification information acquired from the new power receiving apparatus is identical to the identification information acquired in advance and a situation where a change amount of the power supplied from the power source to the power supply antenna corresponding to the identification information acquired from the new power receiving apparatus relative to the power supplied from the power source to the power supply antenna corresponding to the identification information acquired in advance is greater than a third threshold. As a result, it can be determined whether to perform the determination whether to feed using the power acquisition unit provided in advance in the power supply apparatus; therefore, unlike a situation of determining whether to perform the determination whether to feed by measuring the impedance, there is no need to comprise an impedance measurement unit. As a result, the configuration of the power supply apparatus becoming complex can be suppressed to an extent that no impedance measurement unit needs to be provided.

A power supply method according to one or more embodiments of the present invention supplies power from a power source from a power supply apparatus to a power receiving apparatus; sends a load disconnect signal to the power receiving apparatus supplied with power from the power supply apparatus; measures and acquires a power value of the power after sending the load disconnect signal; and determines whether to feed a new power receiving apparatus based on the acquired power value.

In the power supply method according to one or more embodiments of the present invention, as above, by sending the load disconnect signal from the power supply apparatus to the power receiving apparatus supplied with power, measuring and acquiring the power value of the power after sending the load disconnect signal, and determining whether to feed the new power receiving apparatus based on the acquired power value, more power receiving apparatuses can be fed in the power supply method.

According to one or more embodiments of the present invention, a power supply apparatus may comprise a power supply unit that supplies power from a power source to a power receiving apparatus, a power acquisition unit that acquires a power value of power from the power source upon detecting another power receiving apparatus, and a controller that determines whether to supply the power from the power source to the another power receiving apparatus based on the power value.

According to one or more embodiments of the present invention, a power supply apparatus may comprise a power supply unit that supplies power from a power source to at least one of a plurality of power receiving apparatuses, a controller that causes a first power receiving apparatus to stop receiving power from the power supply unit, and causes the power supply unit to supply power from the power source to a second power receiving apparatus that is not receiving power from the power supply unit, and a power acquisition unit that acquires a power value of the power from the power source to the second power receiving apparatus. The controller may determine whether to continue supplying the power from the power source to the second power receiving apparatus based on the acquired power value.

According to one or more embodiments of the present invention, as above, more power receiving apparatuses can be fed.

An amplifier circuit in one or more embodiments of the present invention has a predetermined inductance where a resonant frequency of the amplifier circuit is greater than a predetermined drive frequency and no more than 3.7 times the predetermined drive frequency. That is, a power supply apparatus according to one or more embodiments of the present invention comprises the amplifier circuit, which has the predetermined inductance and is switched at the predetermined drive frequency, and a power supply antenna connected to the amplifier circuit, wherein the amplifier circuit has the predetermined inductance where the resonant frequency of the amplifier circuit is greater than the predetermined drive frequency and no more than 3.7 times the predetermined drive frequency.

The amplifier circuit in one or more embodiments of the present invention has the predetermined inductance where the resonant frequency of the amplifier circuit is greater than the predetermined drive frequency and no more than 3.7 times the predetermined drive frequency. By this configuration, power can be efficiently supplied from the amplifier circuit to the resonant circuit even in a situation where a switching element having a parasitic capacitance is provided in the amplifier circuit.

In the power supply apparatus according to one or more embodiments of the present invention, the amplifier circuit has a predetermined inductance where the resonant frequency is no less than 1.4 times and no more than 2.2 times the predetermined drive frequency. The present inventors found that power can be supplied the most efficiently from the amplifier circuit to the resonant circuit in a situation where the amplifier circuit has a predetermined inductance where the resonant frequency is 1.5 times the predetermined drive frequency. Therefore, configuring the amplifier circuit so the resonant frequency is 1.5 times the predetermined drive frequency is considered; however, it is generally thought that individual variation arises in the inductance of the amplifier circuit or capacitances. The present inventors further found that a comparatively high power efficiency can be obtained in a situation where the amplifier circuit has the predetermined inductance where the resonant frequency is no less than 1.4 times and no more than 2.2 times the predetermined drive frequency. That is, it is found that by configuring the amplifier circuit so the resonant frequency becomes a value on a comparatively-higher-multiplication-factor side than 1.5 times the drive frequency (1.8 times), a comparatively high power efficiency can be obtained even in a situation where individual variation arises in the inductance of the amplifier circuit or the capacitances. In consideration of this, in one or more embodiments of the present invention, the amplifier circuit has the predetermined inductance where the resonant frequency becomes 1.8±0.4 times (no less than 1.4 times and no more than 2.2 times) the predetermined drive frequency; therefore, power can be supplied from the amplifier circuit to the resonant circuit in a state of a comparatively high power efficiency even in the situation where individual variation arises in the inductance of the amplifier circuit or the capacitances. Moreover, this is also confirmed by a simulation by the present inventors described below.

In the power supply apparatus according to one or more embodiments of the present invention, the amplifier circuit includes the switching element, a voltage value applied to the switching element when the switching element is switched becomes substantially zero, and the the amplifier circuit has a predetermined inductance where the resonant frequency is no less than 1.5 and no more than 3.7 times the predetermined drive frequency. The present inventors found that in the situation where the resonant frequency becomes no less than 1.5 times the predetermined drive frequency, the impedance of the resonant circuit seen from the amplifier circuit ideally becomes infinite. As a result, a current flowing in the parasitic capacitance of the switching element from the amplifier circuit can be made to be substantially zero; therefore, it is found that the parasitic capacitance of the switching element can be ignored. Therefore, in one or more embodiments of the present invention, by configuring the amplifier circuit so the voltage value applied to the switching element becomes substantially zero when the switching element is switched and to have the predetermined inductance where the resonant frequency is no less than 1.5 and no more than 3.7 times the predetermined drive frequency, zero-voltage switching can be performed. As a result, power loss when the switching element is switched can be suppressed; therefore, power can be further efficiently supplied from the amplifier circuit to the resonant circuit.

In the power supply apparatus above where the resonant frequency is set to no more than 1.4 times and no less than 2.2 times or no less than 1.5 and no more than 3.7 times the predetermined drive frequency, the amplifier circuit has the predetermined inductance where the resonant frequency is 1.5 times the predetermined drive frequency. The present inventors found that in the situation where the resonant frequency becomes 1.5 times the predetermined drive frequency, a waveform of a voltage applied to the amplifier circuit (switching element) becomes nearest to an ideal voltage waveform for zero-voltage switching. In this situation, power can be supplied the most efficiently from the amplifier circuit to the resonant circuit. Therefore, in one or more embodiments of the present invention, by configuring the amplifier circuit to have the predetermined inductance where the resonant frequency becomes 1.5 times the predetermined drive frequency, the waveform of the voltage applied to the amplifier circuit (switching element) becomes nearest to the ideal voltage waveform for zero-voltage switching; therefore, power can be supplied the most efficiently from the amplifier circuit to the resonant circuit.

In the power supply apparatus according to one or more embodiments of the present invention, the amplifier circuit includes a compensation circuit having a plurality of inductors and a switch that switches a connection state of the plurality of inductors. As a result, the connection state of the plurality of inductors can be switched by the switch; therefore, the inductance of the amplifier circuit can be changed. As a result, the predetermined inductance can be set appropriately by being able to change the inductance of the compensation circuit even in a situation where variation arises in inductances of the inductors provided in the amplifier circuit (compensation circuit).

In this situation, the power supply apparatus further includes a controller that acquires a power efficiency of output power that is power supplied from the amplifier circuit to the resonant circuit relative to input power that is power supplied from an external DC power source to the amplifier circuit and increases the power efficiency by controlling an operation of the switch based on the power efficiency. As a result, the inductance of the amplifier circuit can be appropriately changed automatically by the controller so the power efficiency increases even in the situation where variation is arisen in the inductances of the inductors.

In the power supply apparatus according to one or more embodiments of the present invention, a plurality of amplifier circuits is respectively provided, and the plurality of amplifier circuits is configured as a differential amplifier circuit. As a result, a circuit formed by the plurality of amplifier circuits and a plurality of compensation circuits and the resonant circuit becomes a balancing circuit; therefore, unwanted electric field radiation arising from power supply coils of the resonant circuit can be suppressed.

BRIEF DESCRIPTION OF DRAWINGS

FIG. 6 is a diagram for describing a management table of the power supply apparatus according to one or more embodiments of the second example of the present invention.

FIG. 14 is a diagram for describing a management table of the power supply apparatus according to one or more embodiments of the second modification of the first to fourth examples of the present invention.

FIGS. 18A, 18B, 18C, and 18D are a diagram for describing the waveform of the power of the power supply apparatus according to one or more embodiments of the fifth example of the present invention.

DETAILED DESCRIPTION OF EMBODIMENTS

Embodiments of the present invention will be described below based on the drawings.

FIRST EXAMPLE

Figure 1:
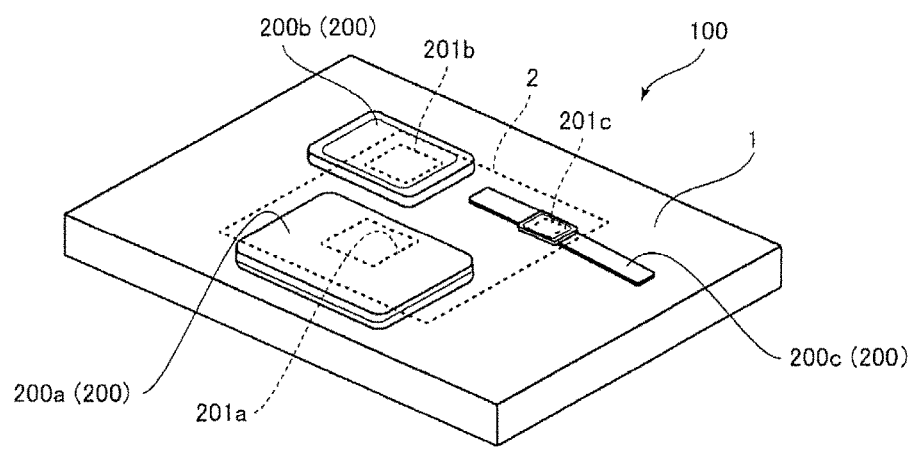
FIG. 1 is a perspective view illustrating an overall configuration of a power supply apparatus and a power receiving apparatus according to one or more embodiments of a first example of the present invention.

A configuration of a power supply apparatus 100 according to one or more embodiments of a first example of the present invention is described with reference to FIGS. 1 to 3. As illustrated in FIG. 1, the power supply apparatus 100 according to one or more embodiments of the first example of the present invention supplies power (as a wireless power supply apparatus, a non-contact power supply apparatus, or a non-contact-point power supply apparatus) to a plurality of power receiving apparatuses 200 disposed near the power supply apparatus 100 using a magnetic resonance method without providing wiring, a contact point, or the like between the power supply apparatus 100 and a power receiving apparatus 200. Moreover, a power supply system (wireless power supply system) is formed by the power supply apparatus 100 and the plurality of power receiving apparatuses 200.

(Overall Configuration of Power Supply Apparatus)

As illustrated in FIG. 1, the plurality of (for example, three) power receiving apparatuses 200 is mounted on an upper surface 1 of the power supply apparatus 100. The power supply apparatus 100 includes a power supply antenna 2. Moreover, the power supply antenna 2 supplies power to (feed), for example, a power receiving antenna 201a of a PC (personal computer) 200a, a power receiving antenna 201b of a smartphone 200b, and a power receiving antenna 201c of a multifunctional watch 200c. The power receiving apparatus 200 may be the PC 200a, the smartphone 200b, and the multifunctional watch 200c.

Figure 2:
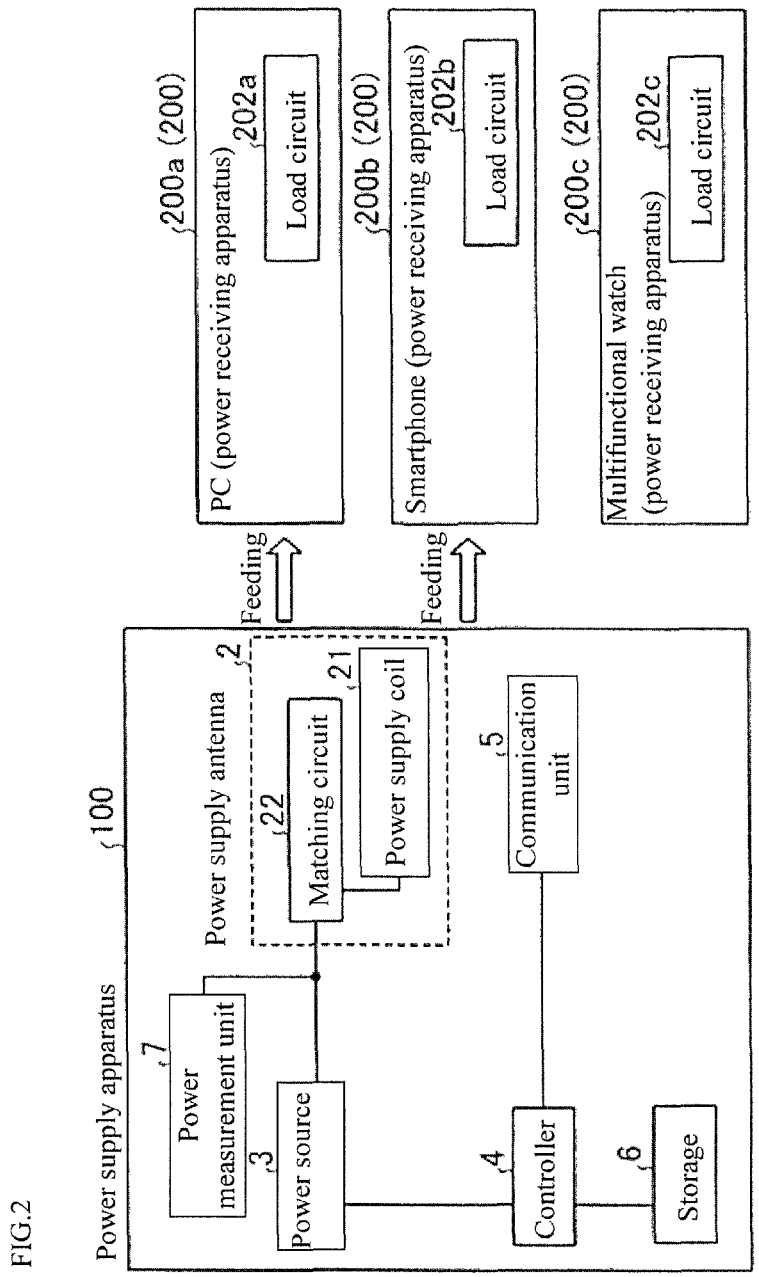
FIG. 2 is a block diagram illustrating a configuration of the power supply apparatus and the power receiving apparatus according to one or more embodiments of the first example of the present invention.

As illustrated in FIG. 2, the power supply apparatus 100 comprises a power source 3, a controller 4, a communication unit 5, a storage 6, and a power measurement unit (power acquisition unit) 7.

In one or more embodiments of the first example of the present invention, the controller 4 sends a load disconnect signal via the communication unit 5 to the power receiving apparatus 200 supplied with power, acquire power value P after sending the load disconnect signal, and determine whether to feed a new power receiving apparatus 200 based on the acquired power value P.

Specifically, in one or more embodiments of the first example of the present invention, the controller 4 sends a maximum load command signal, which commands operating by a maximum load, to the power receiving apparatus 200 via the communication unit 5; acquire the power value P fed to the power receiving apparatus 200 to which the maximum load command signal is sent; and perform a feeding propriety determination control (see FIG. 4) of determining whether to feed the power receiving apparatus 200 to which the maximum load command signal is sent based on the acquired power value P.

(Configuration of Each Unit of Power Supply Apparatus)

As illustrated in FIG. 2, the power supply antenna 2 includes a power supply coil 21 and a matching circuit 22. The power supply coil 21 generates a powered magnetic field by AC power supplied from the power source 3. Moreover, the matching circuit 22 includes, for example, a resonant capacitor and the like and matches an impedance of the power supply coil 21 and an impedance of the power source 3. Moreover, the power supply antenna 2 supplies power by the powered magnetic field to the plurality of power receiving apparatuses 200.

The power source 3 acquires power from an external commercial power source (not illustrated) or a battery unit (not illustrated). Moreover, the power source 3 includes, for example, a so-called E-class amplifier circuit where zero-voltage switching is possible. Moreover, the power source 3 converts the acquired power into AC power having a voltage value based on a command by the controller 4 and having a frequency based on a predetermined standard (the A4WP (Alliance for Wireless Power) standard; for example, 6.78 MHz). Moreover, the power source 3 supplies AC power to the power supply antenna 2.

The controller 4 controls an operation of each unit of the power supply apparatus 100. Moreover, the controller 4 performs feeding propriety determination control processing. Details of the feeding propriety determination control processing are described below using the flowchart in FIG. 4.

The communication unit 5 performs wireless communication based on a predetermined standard (for example, the Bluetooth (registered trademark) standard) with the power receiving apparatus 200. For example, the communication unit 5 may be executed by a communication circuit.

The storage 6 stores a measurement result of the power measurement unit 7 (power value P) based on a command of the controller 4.

The power measurement unit 7 is disposed between the power source 3 and the power supply antenna 2 and measures a size of the power value P supplied from the power source 3 to the power supply antenna 2. Specifically, the power measurement unit 7 measures the power value P by acquiring a voltage value applied to the power supply antenna 2 or a current value flowing from the power source 3 to the power supply antenna 2.

(Configuration of Controller)

According to one or more embodiments of the first example of the present invention, the controller 4 respectively sends the maximum load command signal to the plurality of power receiving apparatuses 200, respectively acquire the power value P fed to the plurality of power receiving apparatuses 200 to which the maximum load command signal is sent, and perform a feeding propriety determination control based on the acquired power value P.

Furthermore, in one or more embodiments of the first example of the present invention, the controller 4 respectively acquires the power value P fed to the plurality of power receiving apparatuses 200 to which the maximum load command signal is sent and perform a control of feeding all power receiving apparatuses 200 to which the maximum load command signal is sent in a situation where a total value PS of the acquired power value P is at or below a maximum feeding power value PM, which is a maximum value of power that can be supplied from the power source 3.

Specifically, in one or more embodiments of the first example of the present invention, the controller 4 respectively and sequentially sends the maximum load command signal to the plurality of power receiving apparatuses 200 and respectively and sequentially acquire the power value P corresponding to the plurality of power receiving apparatuses 200 to which the maximum load command signal is sent.

Furthermore, in one or more embodiments of the first example of the present invention, the controller 4 acquires information on a category from the new power receiving apparatus 200. Moreover, the controller 4 sends the load disconnect signal to at least one power receiving apparatus 200 among the plurality of power receiving apparatuses 200 and stop supply of power at or above a power amount corresponding to the information on the category. Moreover, in one or more embodiments of the first example of the present invention, the controller 4 sends the load disconnect signal to all the plurality of power receiving apparatuses 200 supplied with power when acquiring the power value P corresponding to the new power receiving apparatus 200.

Specifically, the controller 4 determines that the new power receiving apparatus 200 is mounted on the upper surface 1 in a situation where an advertisement signal to establish communication sent from the power receiving apparatus 200 is acquired. For example, in a situation where the smartphone 200b is newly mounted on the upper surface 1 in a state where the PC 200a is mounted on the upper surface 1, the advertisement signal and the information on the category (power category information) are sent from the smartphone 200b and the controller 4 acquires the advertisement signal and the information on the category.

Then, after acquiring the advertisement signal, the controller 4 performs a control of respectively and sequentially sending the maximum load command signal to the PC 200a and the smartphone 200b. The controller 4 sends the maximum load command signal to the PC 200a and sends substantially simultaneously the load disconnect signal to the smartphone 200b. By this, the power measurement unit 7 becomes able to measure only the power value P supplied to the PC 200a operating at the maximum load (this power is defined as P1).

Furthermore, the controller 4 sends the maximum load command signal to the smartphone 200b and sends substantially simultaneously the load disconnect signal to the PC 200a. By this, the power measurement unit 7 becomes able to measure only the power value P supplied to the smartphone 200b operating at the maximum load (this power is defined as P2).

Furthermore, the controller 4 acquires (calculates) the total value PS of the acquired power value P (P1 and P2; defined such that PS1=P1+P2). Moreover, the controller 4 compares between the maximum feeding power value PM, which is the maximum supplied power that can be supplied from the power source 3 to the power supply antenna 2 of the power supply apparatus 100, and the total value PS (PS1).

Furthermore, the controller 4 feeds all power receiving apparatuses 200 corresponding to the total value PS1 (the PC 200a and the smartphone 200b) in a situation where the total value PS1 is at or below the maximum feeding power value PM. That is, the controller 4 performs a control of continuing to feed the PC 200a and starting to feed the smartphone 200b.

Furthermore, the controller 4 is feeds the power receiving apparatus 200 (PC 200a) other than the new power receiving apparatus 200 (smartphone 200b) among the power receiving apparatuses 200 corresponding to the total value PS1 (the PC 200a and the smartphone 200b) in a situation where the total value PS1 exceeds the maximum feeding power value PM.

Furthermore, the controller 4 performs processing similar to the above in a situation where it is determined that another new power receiving apparatus 200 (the multifunctional watch 200c) is mounted on the upper surface 1 in a state where the PC 200a and the smartphone 200b are being fed. Specifically, the controller 4 performs a control of acquiring a total value PS2 of the power value P of the PC 200a, the smartphone 200b, and the multifunctional watch 200c.

Furthermore, the controller 4 continues to feed all power receiving apparatuses 200 corresponding to the total value PS2 (the PC 200a, the smartphone 200b, and the multifunctional watch 200c) in a situation where the total value PS2 is at or below the maximum feeding power value PM.

Furthermore, the controller 4 feeds the power receiving apparatus 200 (the PC 200a and the smartphone 200b) other than the new power receiving apparatus 200 (multifunctional watch 200c) among the power receiving apparatuses 200 corresponding to the total value PS2 (the PC 200a, the smartphone 200b, and the multifunctional watch 200c) in a situation where the total value PS2 exceeds the maximum feeding power value PM.

(Description of Configuration of Controller Using Numerical Value Examples)

Here, an example is described of a situation of configuring the power supply apparatus 100 as class 2 as established by the A4WP standard (the maximum feeding power value PM being 10 W) and configuring the PC 200a and the smartphone 200b as category 3 (consumed power being 6.5 W). Note that "category 3" is one example of "power category information" in the claims.

In this situation, the maximum feeding power value PM of the power supply apparatus 100 is 10 W, and this maximum feeding power value PM is a value smaller than a total value of 13 W (6.5 W+6.5 W) of consumed power of the PC 200a and the smartphone 200b set to category 3.

In one or more embodiments of the first example of the present invention, the power supply apparatus 100 respectively sends the maximum load command signal to the power receiving apparatuses 200, respectively acquire the power value P power supplied to the plurality of power receiving apparatuses 200 to which the maximum load command signal is sent, and perform the feeding propriety determination control based on the acquired power value P.

That is, with the power supply apparatus 100, the power value P1 supplied to the PC 200a in a state of operating at the maximum load is 4 W, and in a situation where the power value P2 supplied to the smartphone 200b in a state of operating at the maximum load is 3 W, the total value PS1 becomes 7 W. Moreover, the total value PS1 is at or below 10 W, which is the maximum feeding power value PM. In this situation, the power supply apparatus 100 simultaneously feeds both the PC 200a and the smartphone 200b regardless of category or class.

(Configuration of Power Receiving Apparatus)

Next, a configuration of the power receiving apparatus 200 is described with reference to FIG. 1 and FIG. 3. Note that the PC 200a, the smartphone 200b, and the multifunctional watch 200c are configured as the power receiving apparatus 200. Moreover, in the PC 200a, the smartphone 200b, and the multifunctional watch 200c, components labeled with identical reference signs are deemed to be similarly configured, and description is omitted.

Figure 3:
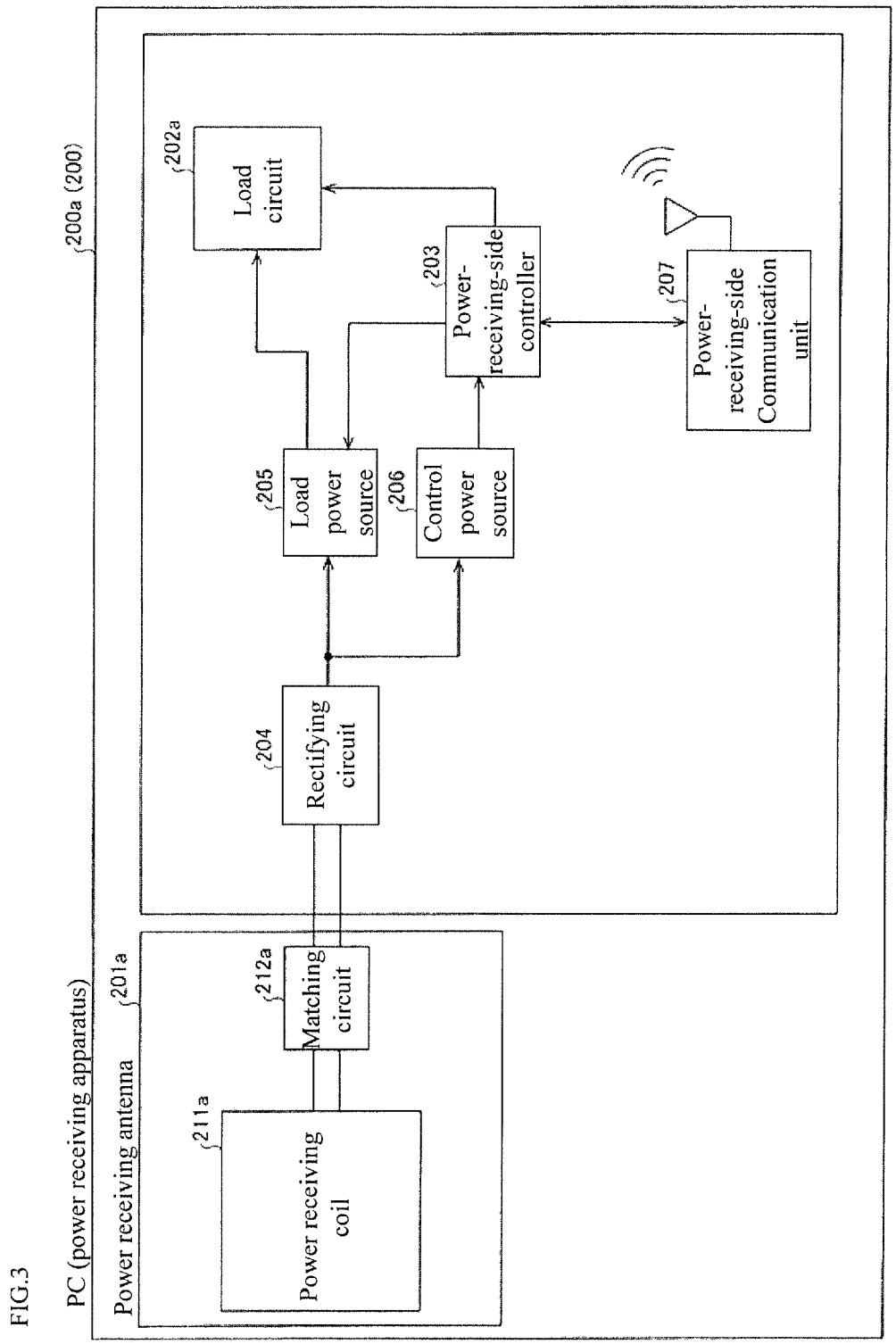
FIG. 3 is a block diagram illustrating a configuration of the power receiving apparatus according to one or more embodiments of the first example of the present invention.

As illustrated in FIG. 3, the PC 200a comprises the power receiving antenna 201a, a load circuit 202a, a power-receiving-side controller 203, a rectifying circuit 204, a load power source circuit 205, a control power source circuit 206, and a power-receiving-side communication unit 207.

As illustrated in FIG. 1 and FIG. 2, the smartphone 200b comprises the power receiving antenna 201b and a load circuit 202b. Moreover, a configuration of the smartphone 200b other than the power receiving antenna 201b and the load circuit 202b is configured similarly to the PC 200a.

As illustrated in FIG. 1 and FIG. 2, the multifunctional watch 200c comprises the power receiving antenna 201c and a load circuit 202c. Moreover, a configuration of the multifunctional watch 200c other than the power receiving antenna 201c and the load circuit 202c is configured similarly to the PC 200a.

The power receiving antenna 201a includes a power receiving coil 211a and a matching circuit 212a. The power receiving coil 211a magnetically couples with the power supply coil 21 and receives power. The matching circuit 212a includes a capacitor and the like and matches an impedance on a rectifying-circuit 204 side and an impedance of the power receiving coil 211a. Moreover, the matching circuit 212a is configured so the power receiving antenna 201a becomes a resonant circuit having a resonant frequency substantially identical to a resonant frequency of the power supply antenna 2.

Furthermore, as illustrated in FIG. 1, the power receiving antenna 201b comprises a power receiving coil having a different size (diameter, size of a side) than the power receiving coil 211a of the power receiving antenna 201a. Moreover, the power receiving antenna 201c comprises a power receiving coil having a different size (diameter, size of a side) than the power receiving coil 211a of the power receiving antenna 201a and the power receiving coil of the power receiving antenna 201b.

The load circuits 202a to 202c are configured, for example, as circuits that consume power to exhibit various types of functions of the power receiving apparatus 200 (for example, in a situation of the load 202b, a function as a smartphone). Moreover, in one or more embodiments of the first example of the present invention, the load circuits 202a to 202c maximize the size of the load (maximize a size of the consumed power) in a situation where a command is acquired from the power-receiving-side controller 203 to maximize the load.

The rectifying circuit 204 includes a plurality of diodes and the like and converts an AC current received by the power receiving antenna 201a (the power receiving antenna 201b or 201c) into a DC current.

Both the load power source circuit 205 and the control power source circuit 206 include a DC/DC converter, a smoothing circuit, and the like. Moreover, the load power source circuit 205 converts a voltage of power from the rectifying circuit 204 into a predetermined voltage suited to driving the load circuit 202a. Moreover, the load power source circuit 205 supplies the converted power to the load circuit 202a. Moreover, the control power source circuit 206 converts the voltage of the power from the rectifying circuit 204 into a predetermined voltage suited to the power-receiving-side controller 203. Moreover, the control power source circuit 206 supplies the converted power to the power-receiving-side controller 203.

The power-receiving-side controller 203 performs overall control of the power receiving apparatus 200. Moreover, the power-receiving-side controller 203 transmits a command of maximizing the load to the load circuit 202a (load circuit 202b or 202c) in a situation where the maximum load command signal is acquired from the power supply apparatus 100 via the power-receiving-side communication unit 207.

Furthermore, the power-receiving-side controller 203 sends an advertisement signal requesting establishment of communication (connection establishment request) to the power supply apparatus 100 via the power-receiving-side communication unit 207 in a situation where the power receiving antenna 201a (power receiving antenna 201b or 201c) starts receiving power from the power supply apparatus 100. Moreover, the power-receiving-side controller 203 sends identification information (ID (identification)) and the information on the category together with the advertisement signal to the power supply apparatus 100 via the power-receiving-side communication unit 207. The identification information is set as, for example, information using a device name or the like.

Furthermore, the power-receiving-side controller 203 sends a signal indicating that power receiving is stopped to the power supply apparatus 100 via the power-receiving-side communication unit 207 in a situation where power receiving from the power supply apparatus 100 stops. Note that the signal indicating that power receiving is stopped may be set as a signal indicating that a power receiving voltage value is become become substantially 0 by configuring the power-receiving-side controller 203 to continuously send power receiving information such as the power receiving voltage value to the power supply apparatus 100.

Furthermore, the power-receiving-side controller 203 stops power receiving by disconnecting a connection between the power receiving antenna 201a (power receiving antenna 201b or 201c) and the load circuit 202a (load circuit 202b or 202c) in a situation where the load disconnect signal is acquired from the power supply apparatus 100.

Furthermore, the power-receiving-side controller 203 connects the disconnected circuits above in a situation where a load connect signal (or the maximum load command signal) is acquired from the power supply apparatus 100 in a state where the load disconnect signal is acquired and power receiving is stopped. Note that the power-receiving-side controller 203 causes the load circuit 202a (load circuit 202b or 202c) to consume the received power by a load of a normal size (at or below the maximum) in a situation where the load connect signal is acquired.

The power-receiving-side communication unit 207 performs wireless communication based on a predetermined standard (for example, the Bluetooth [registered trademark] standard) with the power supply apparatus 100.

(Control Processing of Feeding Propriety Determination by Power Supply Apparatus)

Figure 4:
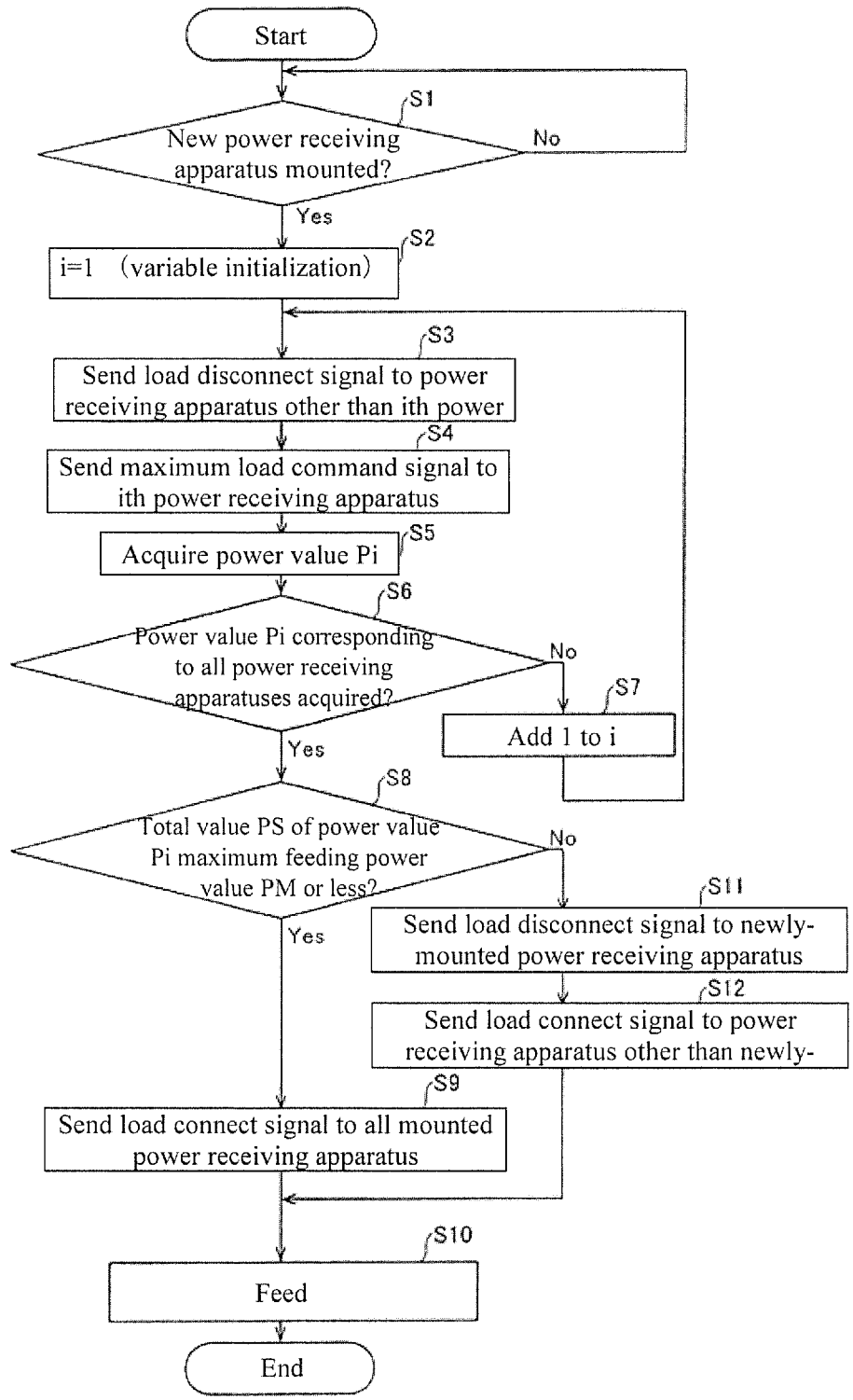
FIG. 4 is a flowchart for describing control processing of feeding propriety determination of the power supply apparatus according to one or more embodiments of the first example of the present invention.

Next, a control processing flow of feeding propriety determination by the power supply apparatus 100 according to one or more embodiments of the first example of the present invention is described with reference to FIG. 4. The following control processing is executed by the controller 4. Note that i is an integer variable. Moreover, at and before step S1 is made to be a feeding state (state where the powered magnetic field is arising from the power supply antenna 2).

First, at step S1, it is determined whether the new power receiving apparatus 200 (second power receiving apparatus) is mounted. Specifically, it is determined whether the advertisement signal is acquired from the power receiving apparatus 200. Thus, the power supply apparatus 100 detects the power receiving apparatus 200 (second power receiving apparatus) that is not receiving power from the power supply apparatus 100. Note that at this step S1, acquisition of the information on the category (power category information) from the new power receiving apparatus 200 is performed. Then, this determination is repeated until the advertisement signal is acquired from the power receiving apparatus 200, and in a situation where the advertisement signal is acquired form the power receiving apparatus 200 the processing proceeds to step S2.

At step S2, the variable i is set to 1 (initialization of the variable i). Afterward, the processing proceeds to step S3.

At step S3, the load disconnect signal is sent to the power receiving apparatuses 200 other than the $i^{th}$ power receiving apparatus 200. At this time, the load disconnect signal may be sent to all power receiving apparatuses 200 (first power receiving apparatus) other than the $i^{th}$ power receiving apparatus 200 or the load disconnect signal may be sent to only a minimum number of power receiving apparatuses 200 (plurality of power receiving apparatuses 200) necessary to stop power of the power amount corresponding to the category of the new power receiving apparatus 200. Afterward, the processing proceeds to step S4. The first power receiving apparatus is any power receiving apparatus 200 that receives power before the power supply apparatus 100 detects the new power receiving apparatus 200 (second power receiving apparatus).

At step S4, the maximum load command signal is sent to the $i^{th}$ power receiving apparatus 200. Afterward, the processing proceeds to step S5.

At step S5, acquisition of power value Pi (for example, power fed to the PC 200a in the state where the load is maximal is P1) is performed. Afterward, the processing proceeds to step S6.

At step S6, it is determined whether the power value Pi corresponding to all power receiving apparatuses 200 is acquired. Specifically, in a situation where three power receiving apparatuses 200 are mounted on the upper surface 1, a maximum value of i is 3. In this situation, it is determined whether i is 3. In a situation where the power value Pi corresponding to all power receiving apparatuses 200 is acquired, the processing proceeds to step S8, and in a situation where the power value Pi corresponding to all power receiving apparatuses 200 is not acquired, the processing proceeds to step S7.

At step S7, 1 is added to i. Afterward, the processing returns to step S3. That is, steps S3 to S7 are repeated until the power value Pi corresponding to all power receiving apparatuses 200 mounted on the upper surface 1 is acquired.

At step S8, it is determined whether the total value PS of the power value Pi is at or below the maximum feeding power value PM. In a situation where the total value PS of the power value Pi is at or below the maximum feeding power value PM, the processing proceeds to step S9, and in a situation where the total value PS of the power value Pi is greater than the maximum feeding power value PM, the processing proceeds to step S11.

At step S9, the load connect signal is sent to all power receiving apparatuses 200 mounted on the upper surface 1.

At step S10, feeding is performed. Afterward, the control processing of feeding propriety determination by the power supply apparatus 100 according to one or more embodiments of the first example of the present invention ends.

At step S11, to which the processing proceeds in the situation where the total value PS of the power value Pi is greater than the maximum feeding power value PM at step S8, the load disconnect signal is sent to the newly-mounted power receiving apparatus 200. Afterward, the processing proceeds to step S12.

At step S12, the load connect signal is sent to the power receiving apparatus 200 other than the newly-mounted power receiving apparatus 200. Note that in a situation where there is no power receiving apparatus 200 other than the newly-mounted power receiving apparatus 200, the load connect signal is not sent and the processing proceeds to step S10. That is, the newly-mounted power receiving apparatus 200 is not fed, and only the power receiving apparatus 200 mounted before the newly-mounted power receiving apparatus 200 is mounted is fed.

Effects of First Example

Effects such as below can be obtained in one or more embodiments of the first example of the present invention.

In one or more embodiments of the first example of the present invention, as above, the power supply apparatus 100 sends the load disconnect signal via the communication unit 5 to the power receiving apparatus 200 supplied with power, acquire the power value P after sending the load disconnect signal, and determine whether to feed the new power receiving apparatus 200 based on the acquired power value P. By this, the actual power value P fed to the new power receiving apparatus 200 is acquired and it can be determined whether to feed the new power receiving apparatus 200 based on the actual power value P. As a result, because this is based on the actual power value P, unlike a situation of determining whether to feed the new power receiving apparatus 200 using simply the category of the new power receiving apparatus 200, being determined to not feed the new power receiving apparatus 200 can be suppressed even in a situation where there is an excess in the power value P that can be fed. Moreover, by sending the load disconnect signal to the power receiving apparatus 200 supplied with power, entering a state where fed power becomes insufficient can be suppressed when the power value P is acquired by supplying power to the new power receiving apparatus 200. As a result, an opportunity to feed the new power receiving apparatus 200 can be ensured more reliably. As a result, more power receiving apparatuses 200 can be fed.

Furthermore, in one or more embodiments of the first example of the present invention, as above, the power supply antenna 2 supplies power to the plurality of power receiving apparatuses 200 and the controller 4 acquires the information on the category from the new power receiving apparatus 200, send the load disconnect signal to at least one power receiving apparatus 200 among the plurality of power receiving apparatuses 200, and stop supply of power at or above the power amount corresponding to the information on the category. By this, entering the state where fed power becomes insufficient can be suppressed more reliably because supply of power at or above the power amount corresponding to the information on the category stops when the power value P is acquired by supplying power to the new power receiving apparatus 200.

Furthermore, in one or more embodiments of the first example of the present invention, as above, the controller 4 sends the load disconnect signal to all the plurality of power receiving apparatuses 200 supplied with power and acquire the power value P by supplying power to the new power receiving apparatus 200. By this, the control processing can be simplified compared to a situation of selecting a portion of the plurality of power receiving apparatuses 200 supplied with power and sending the load disconnect signal, and entering the state where fed power becomes insufficient when the power value P is acquired by supplying power to the new power receiving apparatus 200 can be further suppressed.

Furthermore, in one or more embodiments of the first example of the present invention, as above, the controller 4 sends the maximum load command signal, which commands operating by the maximum load, to the power receiving apparatus 200 via the communication unit 5; acquire the power value P fed to the power receiving apparatus 200 to which the maximum load command signal is sent; and perform the feeding propriety determination control (see FIG. 4) of determining whether to feed the power receiving apparatus 200 to which the maximum load command signal is sent based on the acquired power value P. By this, the power value P fed to the power receiving apparatus 200 to which the maximum load command signal is sent corresponds to the maximum value of the power actually fed to the power supply apparatus 200; therefore, it can be determined whether to feed the power receiving apparatus 200 based on the maximum feeding power value PM and the maximum value (power value P) of the power actually fed to the power receiving apparatus 200 without using the category of the power receiving apparatus 200. That is, the power supply apparatus 100 can feed the maximum feeding power value PM to more power receiving apparatuses 200 to an extent where and because determining to not feed the power receiving apparatus 200 can be suppressed in a situation where the power value P actually fed to the power receiving apparatus 200 falls short (in the situation where there is an excess in the power that can be fed). Moreover, entering the state where the fed power becomes insufficient can be suppressed even in a situation where the load of the power receiving apparatus 200 is maximized.

Furthermore, in one or more embodiments of the first example of the present invention, as above, the power supply antenna 2 is able to supply power to the plurality of power receiving apparatuses 200. Moreover, the controller 4 respectively sends the maximum load command signal to the plurality of power receiving apparatuses 200, respectively acquire the power value P fed to the plurality of power receiving apparatuses 200 to which the maximum load command signal is sent, and the perform feeding propriety determination control (see FIG. 4) based on the acquired power value P. By this, entering the state where fed power becomes insufficient can be suppressed even in a situation where the load of any power receiving apparatus 200 is maximized because the feeding propriety determination control is respectively performed for the plurality of power receiving apparatuses 200.

Furthermore, in one or more embodiments of the first example of the present invention, as above, the controller 4 respectively acquires the power value P fed to the plurality of power receiving apparatuses 200 to which the maximum load command signal is sent and perform the control of feeding all power receiving apparatuses 200 to which the maximum load command signal is sent in the situation where the total value PS of the acquired power value P is at or below the maximum feeding power value PM, which is the maximum value of power that can be supplied from the power source 3. By this, the feeding propriety determination control can be performed easily even in a situation of feeding the plurality of power receiving apparatuses 200 by comparing the total value PS of the acquired power value P and the maximum feeding power value PM.

Furthermore, in one or more embodiments of the first example of the present invention, as above, the controller 4 respectively and sequentially sends the maximum load command signal to the plurality of power receiving apparatuses 200 and respectively and sequentially acquire the power value P corresponding to the plurality of power receiving apparatuses 200 to which the maximum load command signal is sent. By this, unlike a situation of simultaneously acquiring all the power value P corresponding to the plurality of power receiving apparatuses 200, the total value PS of the acquired power value P can be acquired easily even in a situation where the total value PS of the acquired power value P exceeds the maximum feeding power value PM.

SECOND EXAMPLE

Next, a configuration of a power supply apparatus 300 according to one or more embodiments of a second example of the present invention will be described with reference to FIG. 5 and FIG. 6. The power supply apparatus 300 according to one or more embodiments of the second example of the present invention acquires the identification information (ID [identification]) from the power receiving apparatus 200 via the communication unit 5 and acquire an impedance Z of the power supply antenna 2. Note that configurations identical to one or more embodiments of the first example of the present invention above are labeled with the same reference signs, and description thereof is omitted.

(Configuration of Power Supply Apparatus According to Second Example)

Figure 5:
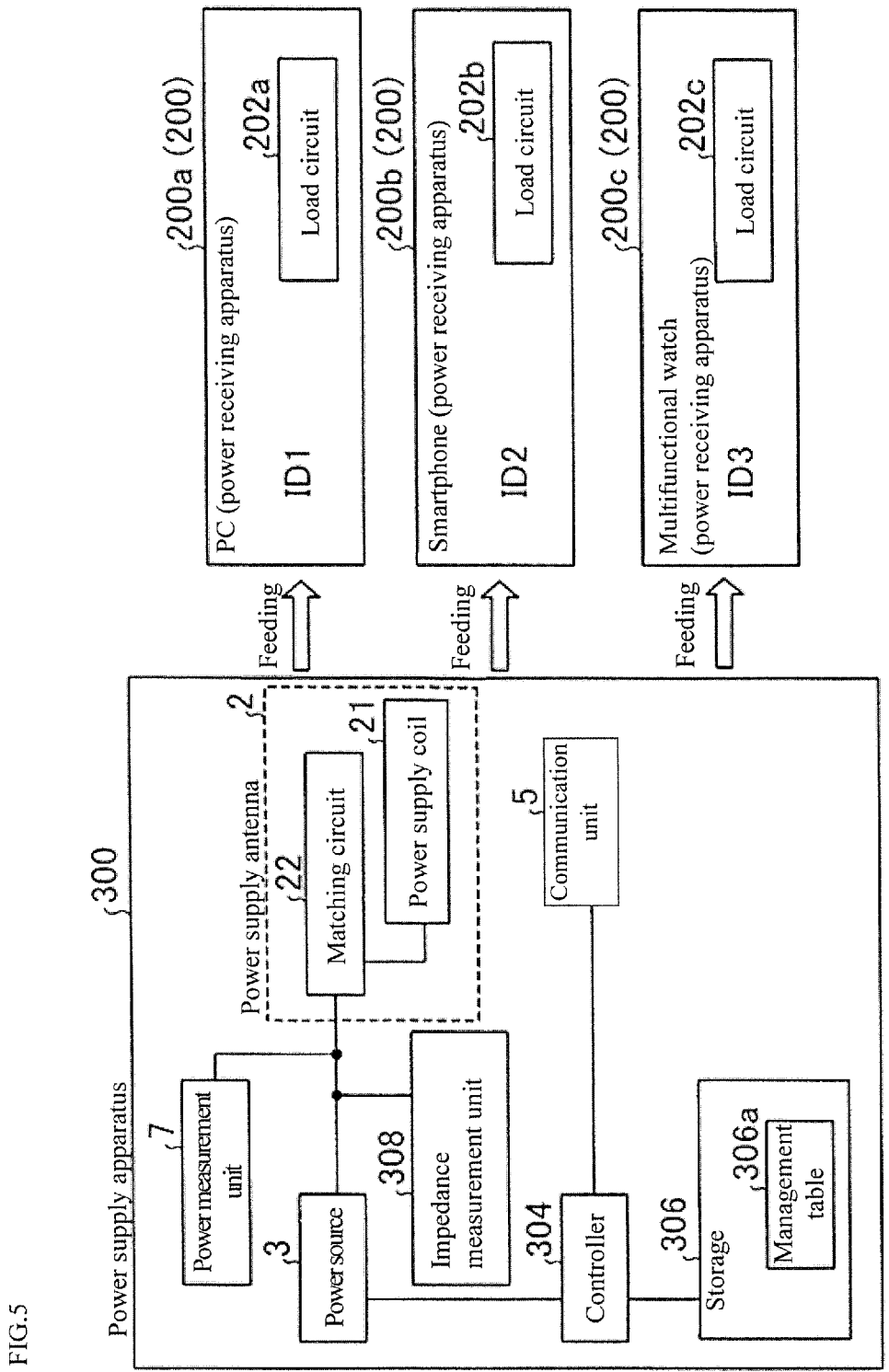
FIG. 5 is a block diagram illustrating a configuration of a power supply apparatus according to one or more embodiments of a second example of the present invention.

As illustrated in FIG. 5, the power supply apparatus 300 according to one or more embodiments of the second example of the present invention includes a controller 304, a storage 306, and an impedance measurement unit (impedance measurement circuit) 308.

In one or more embodiments of the second example of the present invention, the controller 304 acquires the identification information from the power receiving apparatus 200 via the communication unit 5 and perform a control of feeding the power receiving apparatus 200 corresponding to the newly-acquired identification information without sending the maximum load command signal to the power receiving apparatus 200 corresponding to the newly-acquired identification information in a situation where the newly-acquired identification information is identical to identification information acquired in advance (identification information included in a management table 306a stored in the storage 306). Moreover, the controller 304 performs the feeding propriety determination control (see FIG. 4) in a situation where the newly-acquired identification information is not identical to the identification information acquired in advance.

Furthermore, in one or more embodiments of the second example of the present invention, the impedance measurement unit 308 measures the impedance Z of the power supply antenna 2. Moreover, the controller 304 performs the feeding propriety determination control (see FIG. 4) in a situation where the newly-acquired identification information is identical to the identification information acquired in advance and a situation where a change amount V of a measurement value of the impedance Z corresponding to the newly-acquired identification information relative to the impedance Z corresponding to the identification information acquired in advance is greater than a threshold Vt1 (for example, 5Ω). Note that the threshold Vt1 is one example of "first threshold" in the claims.

Specifically, the power receiving apparatus 200 sends the advertisement signal and the identification information to the power supply apparatus 300 via the power-receiving-side communication unit 207 in response to power receiving starting. Note that the identification information is set as, for example, information using the device name. Moreover, the controller 304 acquires the advertisement signal and the identification information from the power receiving apparatus 200.

The controller 304 measures the impedance Z of the power supply antenna 2 by the impedance measurement unit 308 after acquiring the identification information from the power receiving apparatus 200. Moreover, as illustrated in FIG. 6, the controller 304 associates and stores as the management table 306a in the storage 306 the identification information acquired from the power receiving apparatus 200 and the measured impedance Z. Note that the controller 304 measures the impedance Z at predetermined time intervals (for example, 1 second) by the impedance measurement unit 308 while feeding the power receiving apparatus 200.

The management table 306a stored in the storage 306 (table of a correspondence relationship between the identification information and the impedance Z) is described with reference to FIG. 6. For example, the identification information of the PC 200a is defined as ID1, the identification information of the smartphone 200b is defined as ID2, and the identification information of the multifunctional watch 200c is defined as ID3.

The controller 304 acquires the identification information ID1 and ID2 and an impedance Z1 during feeding of the PC 200a and the smartphone 200b in a situation where the PC 200a and the smartphone 200b are being fed (situation where the PC 200a and the smartphone 200b are mounted on the upper surface 1). Then, the controller 304 associates and stores in the storage 306 the identification information ID1 and ID2 and the impedance Z1.

Then, feeding from the power supply apparatus 300 to the PC 200a stops in a situation where the PC 200a is removed from within to without a range of the powered magnetic field of the power supply apparatus 300 (from the upper surface 1) by a user. At this time, the PC 200a sends the signal indicating that power receiving is stopped to the power supply apparatus 300 via the power-receiving-side communication unit 207. Afterward, the advertisement signal and the identification information ID1 are sent from the PC 200a to the power supply apparatus 300 in a situation where the PC 200a is again returned from without to within the powered magnetic field of the power supply apparatus 300 (mounted on the upper surface 1).

Furthermore, the controller 304 references the identification information stored as the management table 306a in the storage 306 in a situation where the advertisement signal and the identification information ID1 are newly acquired. In this situation, the controller 304 performs a control of determining that the newly-acquired identification information ID1 is identical to the identification information ID1 acquired in advance (identification information included in the management table 306a stored in the storage 306) because the management table 306a is stored in the storage 306 in a state where the identification information ID1 and ID2 and the impedance Z1 are associated. In this situation, as illustrated in FIG. 6, the controller 304 may store the identification information ID1 acquired the second time as, for example, ID1 (second time) to be able to be distinguished from the identification information ID1 acquired the first time.

Furthermore, the controller 304 acquires an impedance Z2 during feeding of the PC 200a and the smartphone 200b. Then, the controller 304 associates and stores in the storage 306 the identification information ID1 (second time) and ID2 and the impedance Z2.

Furthermore, the controller 304 performs the feeding propriety determination control (see FIG. 4) in a situation where the change amount V (=|Z2−Z1|) of the newly-acquired impedance Z2 relative to the impedance Z1 is greater than the threshold Vt1. Moreover, the controller 304 performs a control of continuing to feed the PC 200a and the smartphone 200b without performing the feeding propriety determination control (see FIG. 4) in a situation where the change amount V (=|Z2−Z1|) of the newly-acquired impedance Z2 relative to the impedance Zi is at or below the threshold Vt1.

That is, the controller 304 performs a control of detecting a change in a placement (disposal position, disposal direction, and the like) due to the PC 200a being temporarily removed from the power supply apparatus 300 and being remounted by measuring the change amount V of the impedance Z.

Here, a coupling coefficient changes and the impedance Z changes in a situation where the placement of the power receiving apparatus 200 on the power supply apparatus 300 changes. In this situation, the size of the power value P of power fed to the power receiving apparatus 200 in the state of operating at the maximum load changes. Therefore, the controller 304 can appropriately determine whether the feeding propriety determination control needs to be performed by measuring the change amount V of the impedance Z.

Note that as illustrated in FIG. 6, the controller 304 acquires the identification information ID3 similarly to the above even in a situation where the multifunctional watch 200c is newly mounted on the upper surface 1 and acquires and stores in the storage 306 impedances Z3 (situation where the smartphone 200b is not mounted) and Z4 (situation where the smartphone 200b is mounted).

Furthermore, other configurations of the power supply apparatus 300 according to one or more embodiments of the second example of the present invention are similar to the power supply apparatus 100 according to one or more embodiments of the first example of the present invention.

(Execution Determination Control Processing of Feeding Propriety Determination Control of Power Supply Apparatus According to Second Example)

Figure 7:
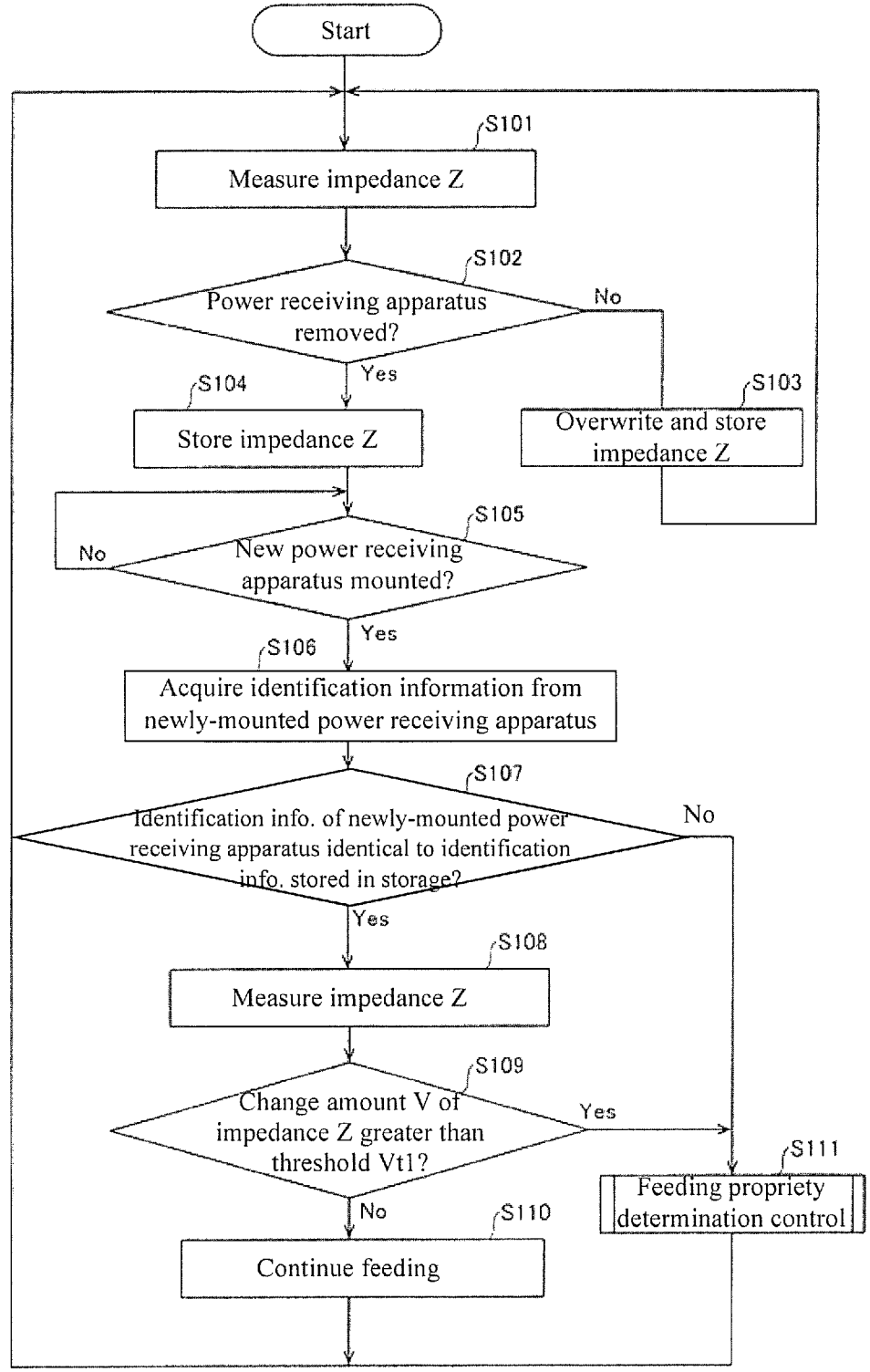
FIG. 7 is a flowchart for describing control processing of execution determination of a feeding propriety determination control of the power supply apparatus according to one or more embodiments of the second example of the present invention.

Next, an execution determination control process flow of the feeding propriety determination control by the power supply apparatus 300 according to one or more embodiments of the second example of the present invention will be described with reference to FIG. 7. The following control processing is executed by the controller 304. At and before step S101 is made to be the feeding state (state where the powered magnetic field is arising from the power supply antenna 2).

First, at step S101, measurement of the impedance Z is performed. For example, as illustrated in FIG. 7, acquisition of the impedance Z1 is performed in the situation where the PC 200a and the smartphone 200b are being fed from the power supply apparatus 300. Afterward, the processing proceeds to step S102.

At step S102, it is determined whether the power receiving apparatus 200 is removed. That is, it is determined whether the signal indicating that power receiving is stopped is acquired from any of the plurality of power receiving apparatuses 200. In a situation where the power receiving apparatus 200 is removed, the processing proceeds to step S104, and in a situation where the power receiving apparatus 200 is not removed, the processing proceeds to step S103.

At step S103, the impedance Z is overwritten and stored. That is, the measured impedance Z is stored in the storage 306 as, for example, the impedance Z1 in the situation where the power receiving apparatus 200 is not removed. Afterward, the processing returns to step S101.

At step S104, the impedance Z is stored. For example, the measured impedance Z is stored as the impedance Z1 in the storage 306. Afterward, the processing proceeds to step S105.

At step S105, it is determined whether the power receiving apparatus 200 is newly mounted. That is, it is determined whether the advertisement signal is newly acquired. This determination is repeated until the power receiving apparatus 200 is newly mounted, and in a situation where the power receiving apparatus 200 is newly mounted, the processing proceeds to step S106. Note that at step S105, the impedance Z may be repeatedly measured, overwritten, and stored in the storage 306 at predetermined time intervals until the power receiving apparatus 200 is newly mounted.

At step S106, acquisition of the identification information from the newly-mounted power receiving apparatus 200 is performed. Afterward, the processing proceeds to step S107.

At step S107, it is determined whether the newly-acquired identification information is identical to the identification information included in the management table 306a stored in the storage 306 (identification information acquired in advance). In a situation where the newly-acquired identification information is identical to the identification information acquired in advance, the processing proceeds to step S108, and in a situation where the newly-acquired identification information is not identical to the identification information acquired in advance, the processing proceeds to step S111.

At step S108, the impedance Z is measured. For example, as illustrated in FIG. 6, in a situation where the PC 200a (identification information ID1) is temporarily removed and again mounted on the power supply apparatus 300, the impedance Z2 is measured. Afterward, the processing proceeds to step S109.

At step S109, it is determined whether the change amount V ($=|Z2-Z1|$) of the impedance Z is greater than the threshold Vt1. In a situation where the change amount V is greater than the threshold Vt1, the processing proceeds to step S111, and in a situation where the change amount V is at or below the threshold Vt1, the processing proceeds to step S110.

At step S110, feeding is continued. That is, feeding continues without the feeding propriety determination control (see FIG. 4) being performed. Afterward, the processing returns to step S101.

The feeding propriety determination control (see FIG. 4) is performed at step S111 to which the processing proceeds in the situation where at step S107 the newly-acquired identification information is not identical to the identification information acquired in advance or the situation where at step S109 the change amount V is greater than the threshold Vt1. That is, the feeding propriety determination control (see FIG. 4) is performed in the situation where the power receiving apparatus 200 is temporarily removed from the power supply apparatus 300, the situation where the newly-acquired identification information is not identical to the identification information acquired in advance, and the situation where the change amount V is greater than the threshold Vt1.

Effects of Second Example

Effects such as below can be obtained in one or more embodiments of the second example of the present invention.

In one or more embodiments of the second example of the present invention, as above, the controller 304 acquires the identification information from the power receiving apparatus 200 via the communication unit 5 and perform the control of feeding the power receiving apparatus 200 corresponding to the newly-acquired identification information without sending the maximum load command signal to the power receiving apparatus 200 corresponding to the newly-acquired identification information in the situation where the newly-acquired identification information is identical to the identification information acquired in advance (identification information included in the management table 306a stored in the storage 306). By this, after the power receiving apparatus 200 is temporarily removed from the power supply apparatus 300 and feeding is temporarily stopped, feeding can be restarted without performing the feeding propriety determination control (see FIG. 4) by determining based on the identification information in the situation where the same power receiving apparatus 200 is again disposed on the power supply apparatus 300. That is, feeding the power receiving apparatus 200 can be restarted speedily to an extent that the feeding propriety determination control does not need to be performed.

Furthermore, in one or more embodiments of the second example of the present invention, as above, the power supply apparatus 300 comprises the impedance measurement unit 308 that measures the impedance Z of the power supply antenna 2. Moreover, the controller 304 performs the feeding propriety determination control (see FIG. 4) in the situation where the newly-acquired identification information is identical to the identification information acquired in advance (identification information included in the management table 306a stored in the storage 306) and the situation where the change amount V of the impedance Z corresponding to the newly-acquired identification information relative to the impedance Z corresponding to the identification information acquired in advance is greater than the threshold Vt1. By this, a change in the placement or the like (change in the coupling coefficient [feeding efficiency]) can be detected by acquiring the change amount V of the impedance Z even in a situation where the placement or the like changes and the coupling coefficient (feeding efficiency) changes in the situation where after the power receiving apparatus 200 is temporarily removed from the power supply apparatus 300 and feeding is temporarily stopped the same power receiving apparatus 200 is again disposed on the power supply apparatus 300. As a result, in the situation where the placement or the like of the power receiving apparatus 200 changes (coupling coefficient [feeding efficiency] changes), it can be determined appropriately whether feeding is possible by performing the feeding propriety determination control.

Furthermore, other effects of the power supply apparatus 300 according to one or more embodiments of the second example of the present invention are similar to the power supply apparatus 100 according to one or more embodiments of the first example of the present invention.

THIRD EXAMPLE

Next, a configuration of a power supply apparatus 400 according to one or more embodiments of a third example of the present invention will be described with reference to FIG. 8. The power supply apparatus 400 according to one or more embodiments of the third example of the present invention controls a display 401 to notify a request to the user to correct the placement of the power receiving apparatus 200. Configurations identical to one or more embodiments of the first or second example above are labeled with the same reference signs, and description thereof is omitted.

(Configuration of Power Supply Apparatus According to Third Embodiment)

Figure 8:
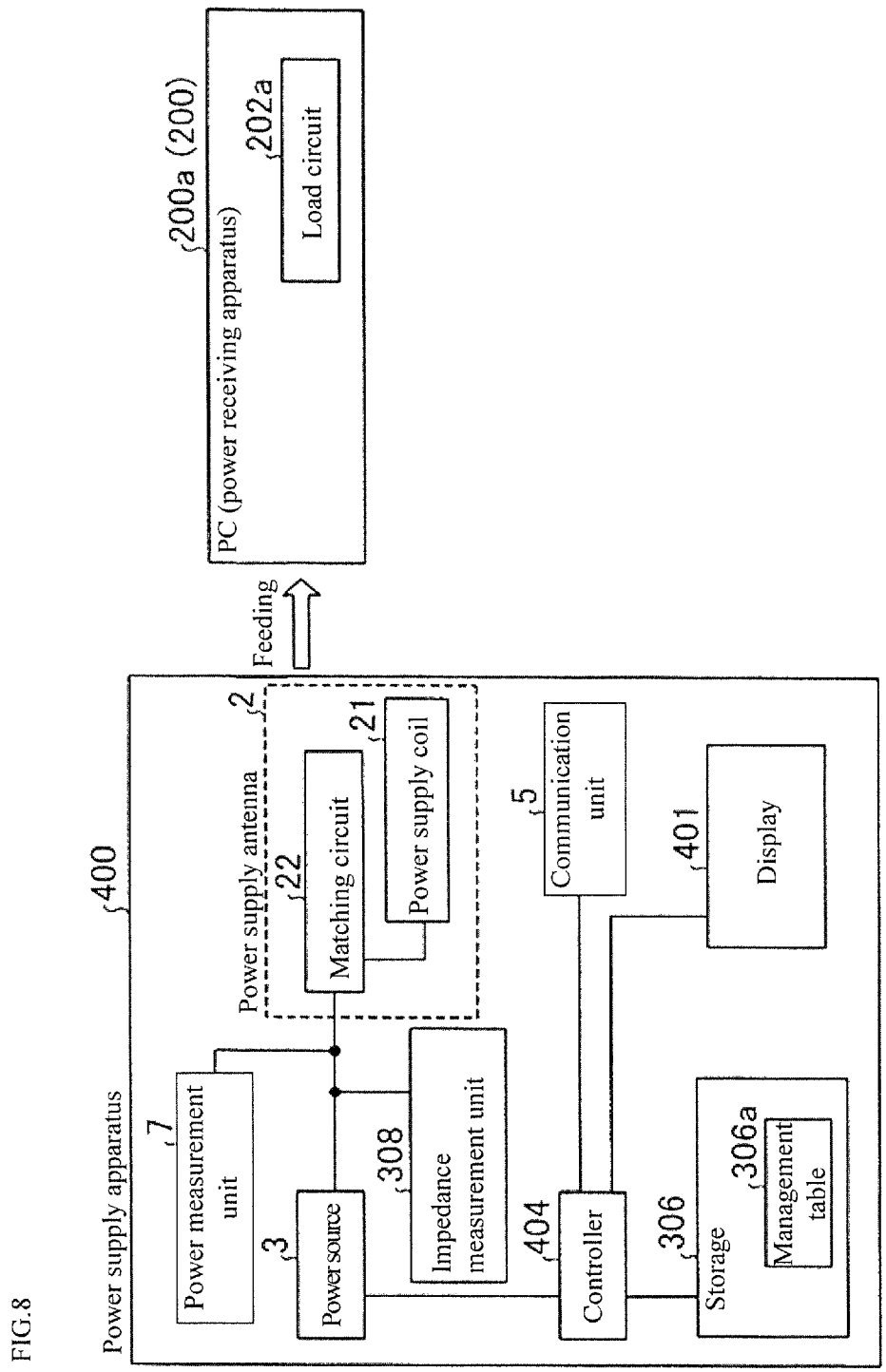
FIG. 8 is a block diagram illustrating a configuration of a power supply apparatus according to one or more embodiments of a third example of the present invention.

As illustrated in FIG. 8, the power supply apparatus 400 according to one or more embodiments of the third example of the present invention includes the storage 306, the impedance measurement unit 308, the display 401, and a controller 404. Note that the display 401 is one example of "notification unit" in the claims.

In one or more embodiments of the third example of the present invention, the display 401 notifies information to the user by displaying the information. Moreover, the controller 404 controls the display 401 to notify the user by displaying the request to correct the placement of the power receiving apparatus 200 in the situation where the newly-acquired identification information is identical to the identification information acquired in advance and a situation where an increase amount of the impedance Z corresponding to the newly-acquired identification information relative to the impedance Z corresponding to the identification information acquired in advance is at or above a threshold Vt2 (for example, 5Ω). Note that the threshold Vt2 is one example of "second threshold" in the claims.

Specifically, the display 401 is configured by a liquid crystal panel and the like and displays characters, shapes, and the like based on a command from the controller 404.

Similarly to the controller 304 of the power supply apparatus 300 according to one or more embodiments of the second example of the present invention, the controller 404 determines whether the newly-acquired identification information (for example, ID1) is identical to the identification information acquired in advance (identification information of the management table 306a stored in the storage 306) in the situation where the power receiving apparatus 200 is removed and again mounted. Moreover, the controller 404 acquires the impedance Z corresponding to the newly-acquired identification information (defined as, for example, the impedance Z4).

Furthermore, the controller 404 determines whether an increase amount (Z4−Z1) of the impedance Z4 corresponding to the newly-acquired identification information relative to the impedance Z corresponding to the identification information (ID1) acquired in advance (defined as, for example, the impedance Z1) is at or above the threshold Vt2 in the situation where the newly-acquired identification information (for example, ID1) is identical to the identification information acquired in advance (for example, ID1). Moreover, the controller 404 controls the display 401 to display, for example, the characters, "please correct the placement or position of the power receiving apparatus", which requests correction of the placement, in the situation where Z4−Z1≥Vt2.

Furthermore, other configurations of the power supply apparatus 400 according to one or more embodiments of the third example of the present invention are similar to the power supply apparatus 100 in one or more embodiments of the first example of the present invention.

(Notification Control Processing of Placement Correction of Power Supply Apparatus According to Third Embodiment)

Figure 9:
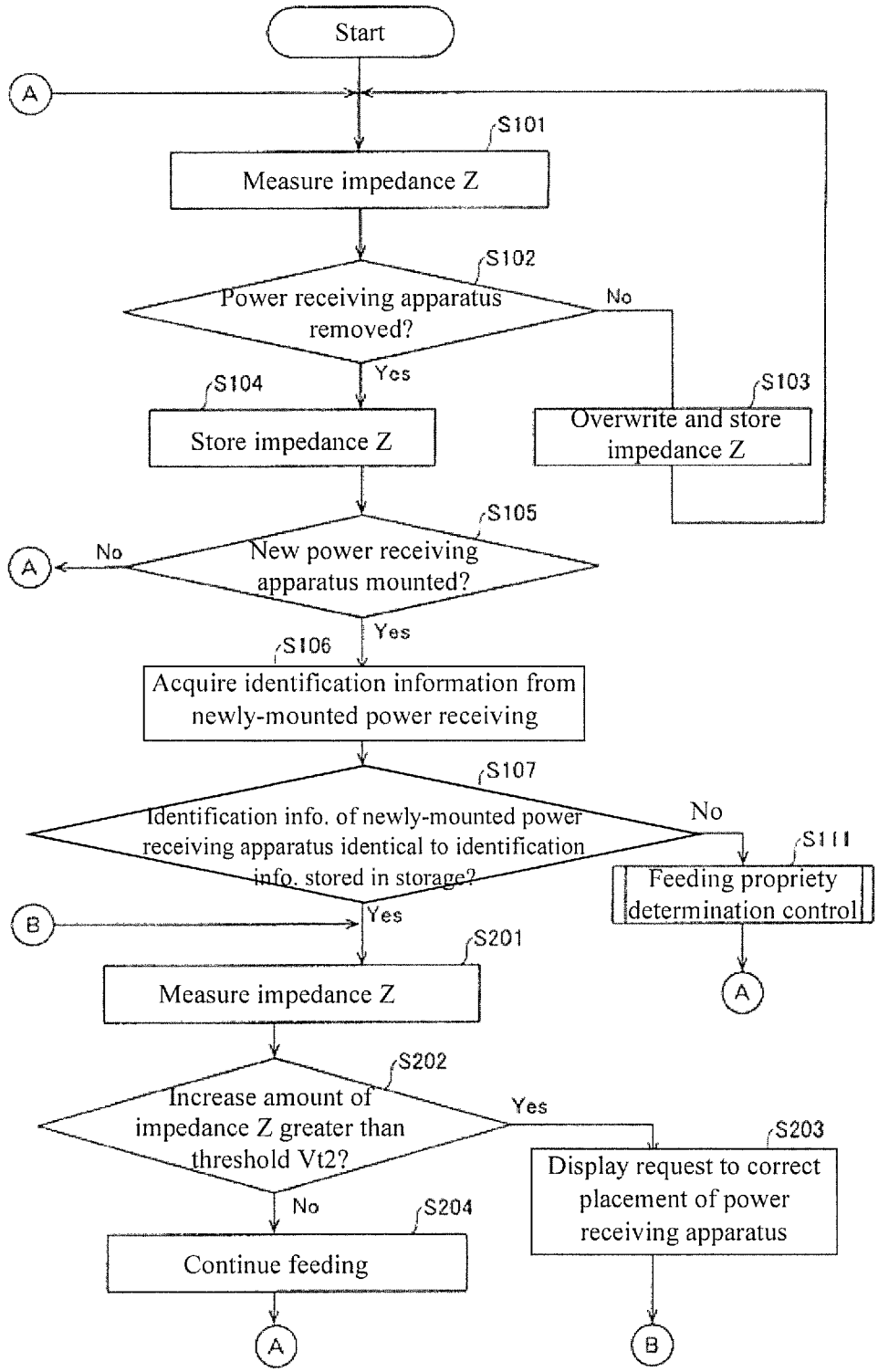
FIG. 9 is a flowchart for describing notification control processing of placement correction of the power supply apparatus according to one or more embodiments of the third example of the present invention.

Next, a notification control processing flow of placement correction by the power supply apparatus 400 according to one or more embodiments of the third example of the present invention is described with reference to FIG. 9. The following control process is executed by the controller 404. Note that processing similar to the execution determination processing of the feeding propriety determination control by the power supply apparatus 300 according to one or more embodiments of the second example of the present invention (see FIG. 7) is labeled with the same reference signs (step numbers), and description is omitted.

First, at steps S101 to S107 and step S111, processing similar to the execution determination processing of the feeding propriety determination control by the power supply apparatus 300 according to one or more embodiments of the second example of the present invention (see FIG. 7) is performed. Then, in one or more embodiments of the third example of the present invention, at step S107, the processing proceeds to step S201 in the situation where the newly-acquired identification information (for example, ID1) is identical to the identification information acquired in advance (identification information of the management table 306a stored in the storage 306).

At step S201, the impedance Z (for example, the impedance Z4) is measured. Afterward, the processing proceeds to step S202.

At step S202, it is determined whether the increase amount of the impedance Z (Z4−Z1) is become the threshold Vt2 or more. That is, it is determined whether Z4−Z1≥Vt2. In a situation where the increase amount of the impedance Z (Z4−Z1) becomes the threshold Vt2 or more, the processing proceeds to step S203, and in a situation where the increase amount of the impedance Z (Z4−Z1) is less than the threshold Vt2 (Z4−Z1<Vt2), the processing proceeds to step S204.

At step S203, the display requesting the user to correct the placement of the power receiving apparatus 200 is performed by the display 401. Afterward, the processing returns to step S201. That is, steps S201 to S203 are repeated until the increase amount of the impedance Z (Z4−Z1) enters a state of being less than the threshold Vt2.

At step S204, feeding is continued. Afterward, the processing returns to step S101.

Effects of Third Example

Effects such as below can be obtained in one or more embodiments of the third example of the present invention.

In one or more embodiments of the third example of the present invention, as above, the power supply apparatus 404 comprises the display 401 that notifies the information to the user. Moreover, the controller 404 controls the display 401 to notify the user the request to correct the placement of the power receiving apparatus 200 in the situation where the newly-acquired identification information is identical to the identification information acquired in advance and the situation where the increase amount (Z4−Z1) of the impedance Z corresponding to the newly-acquired identification information (impedance Z4) relative to the impedance Z corresponding to the identification information acquired in advance (impedance Z1) is at or above the threshold Vt2 (Z4−Z1≥Vt2). By this, the user can be notified by the display 401 to correct the placement even in a situation where the placement or the like changes and the coupling coefficient (feeding efficiency) changes in a situation where after the power receiving apparatus 200 is temporarily removed from the power supply apparatus 400 and feeding is temporarily stopped the power receiving apparatus 200 is again disposed on the power supply apparatus 400. By this, feeding can be performed with high efficiency.

Furthermore, other effects of the power supply apparatus 400 according to one or more embodiments of the third example of the present invention are similar to the power supply apparatus 100 in one or more embodiments of the first example of the present invention.

FOURTH EXAMPLE

Next, a configuration of a power receiving apparatus 500 according to one or more embodiments of a fourth example of the present invention will be described with reference to FIG. 10. The power receiving apparatus 500 according to one or more embodiments of the fourth example of the present invention comprises a maximum load operation unit 501 and a switch 502 separate from the load circuit 202a. Moreover, the power receiving apparatus 500 according to one or more embodiments of the fourth example of the present invention can also be configured as a power supply system that operates in correspondence with the power supply apparatus 100 according to one or more embodiments of the first example of the present invention. Configurations identical to one or more embodiments of the first to third examples of the present invention are labeled with the same reference signs, and description thereof is omitted.

(Configuration of Power Receiving Apparatus According to Fourth Example)

Figure 10:
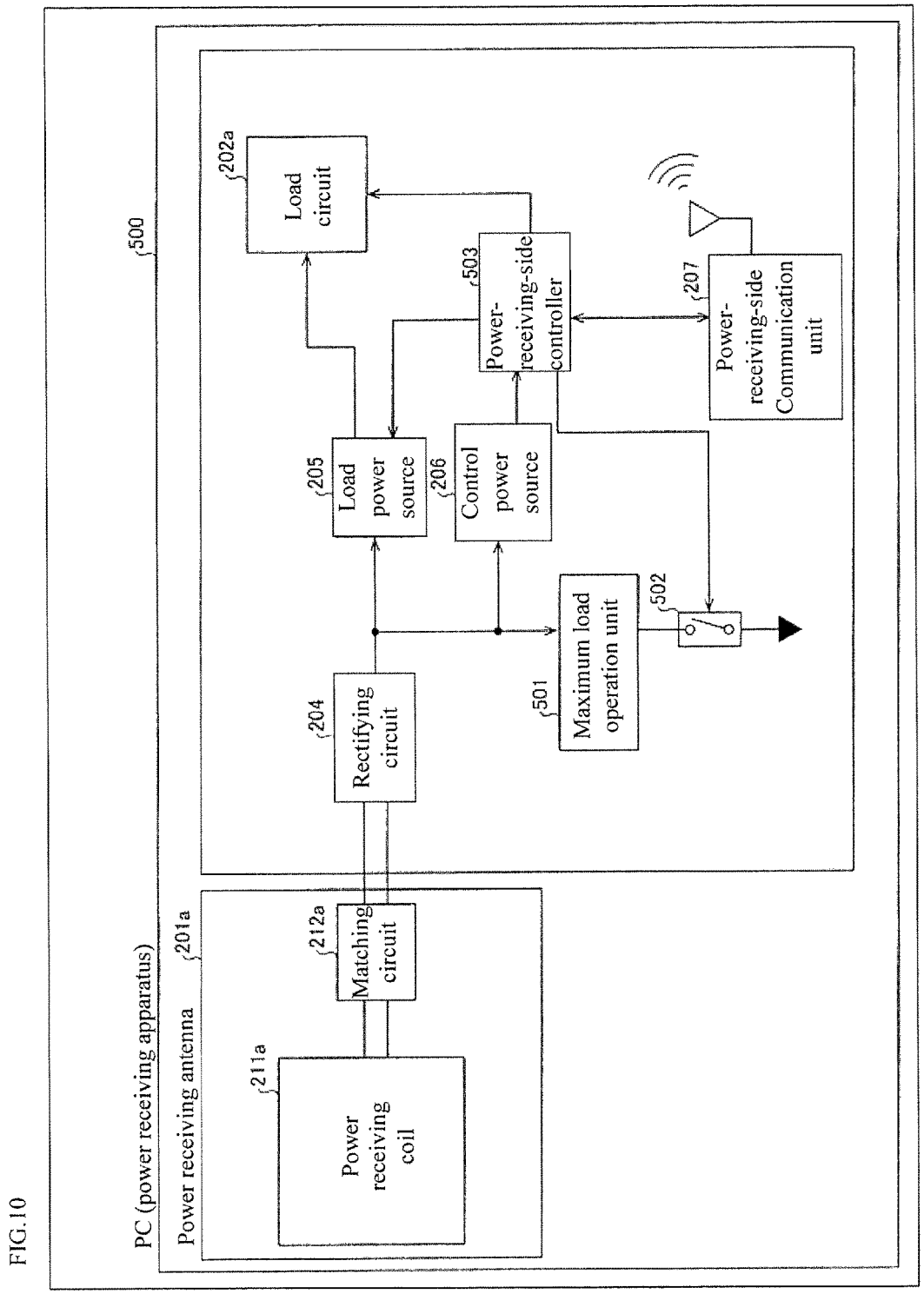
FIG. 10 is a block diagram illustrating a configuration of a power receiving apparatus according to one or more embodiments of a fourth example of the present invention.

As illustrated in FIG. 10, the power receiving apparatus 500 according to one or more embodiments of the fourth example of the present invention comprises the maximum load operation unit 501, the switch 502, and a power-receiving-side controller 503.

In one or more embodiments of the fourth example of the present invention, the maximum load operation unit 501 and the switch 502 are provided separate from the load circuit 202a. The maximum load operation unit 501 consists of, for example, a resistance load. The maximum load operation unit 501 shares a common node with the load power source circuit 205 and control power source circuit 206. Each of the maximum load operation unit 501, the load power source circuit 205 and control power source circuit 206 is connected to the rectifying circuit 204 via the common node. Moreover, the load circuit 202a consists of a battery.

The switch 502 has one end connected to the maximum load operation unit 501 and another end grounded. Moreover, the switch 502 switches between a state of connecting the one end and the other end and grounding the maximum load operation unit 501 and a state of disconnecting the one end and the other end and not grounding the maximum load operation unit 501 based on a command of the power-receiving-side controller 503.

The maximum load operation unit 501 is configured so in the grounded state a current flows in the maximum load operation unit 501 and the power receiving apparatus 500 is made to enter a state where power is consumed by the maximum load. Moreover, the maximum load operation unit 501 is configured so in the ungrounded state substantially no current flows in the maximum load operation unit 501; in this situation, in the power receiving apparatus 500, power is consumed to an extent that the load circuit 202a operates (is charged).

Furthermore, in one or more embodiments of the fourth example of the present invention, the power-receiving-side controller 503 connects the switch 502 and causing, by the maximum load operation unit 501, the power receiving apparatus 500 to enter the state where power is consumed by the maximum load in the situation where the maximum load command signal is acquired from the power supply apparatus 100 (see FIG. 2).

Furthermore, the power supply apparatus 100 performs the feeding propriety determination control (see FIG. 4) based on the power value P fed to the power receiving apparatus 500.

Furthermore, other configurations of the power receiving apparatus 500 according to one or more embodiments of the fourth example of the present invention are similar to the power receiving apparatus 200 in one or more embodiments of the first example of the present invention.

Effects of Fourth Example

Effects such as below can be obtained in one or more embodiments of the fourth example of the present invention.

In one or more embodiments of the fourth example of the present invention, as above, the power receiving apparatus 500 comprises the maximum load operation unit 501 and the switch 502 separate from the load circuit 202a. Moreover, the power-receiving-side controller 503 connects the switch 502 and causing, by the maximum load operation unit 501, the power receiving apparatus 500 to enter the state where power is consumed by the maximum load in the situation where the maximum load command signal is acquired from the power supply apparatus 100 (see FIG. 2). In the situation where the load circuit 202a consists of the battery, a size of the load changes depending on a remaining capacity of the battery, and it may be difficult to cause the load circuit 202a to enter the state of the maximum load by the command of the power-receiving-side controller 503 depending on the remaining capacity of the battery. Therefore, by the power receiving apparatus 500 comprising the maximum load operation unit 501 and the switch 502 separate from the load circuit 202a, the power receiving apparatus 500 can be entered into the state of the maximum load even in the situation where the power receiving apparatus 500 comprises the load circuit 202a, which is difficult to cause to enter the state of the maximum load. As a result, the power supply apparatus 100 can perform the feeding propriety determination control (see FIG. 4) by sending the maximum load command signal to the power receiving apparatus 500 as well, which comprises the load circuit 202a (battery) that is difficult to cause to enter the state of the maximum load, in addition to the power receiving apparatus 200; therefore, a versatility of the power supply apparatus 100 can be improved.

Furthermore, other effects of the power receiving apparatus 500 according to one or more embodiments of the fourth example of the present invention are similar to the power supply apparatus 100 in one or more embodiments of the first example of the present invention.

MODIFIED EXAMPLES

Embodiments disclosed herein are examples on all counts and should not be considered limiting. The scope of the present invention is indicated not by the description of the embodiments given above but by the scope of patent claims and further includes meanings equivalent to the scope of patent claims and all modifications (modified examples) within the scope.

For example, in one or more embodiments of the first to fourth examples of the present invention, an example is illustrated of using a PC, a smartphone, and a multifunctional watch as a power receiving apparatus, but the present invention is not limited thereto. For example, transport equipment such as an electric automobile may be used as the power receiving apparatus. In this situation, the power supply apparatus may be configured as a power supply station for transport equipment.

Furthermore, in one or more embodiments of the first to fourth examples of the present invention, an example is illustrated of providing one power supply antenna to the power supply apparatus, but the present invention is not limited thereto. That is, the power supply apparatus may comprise a plurality of power supply antennas, and the power supply apparatus may be feeds the power receiving apparatus from respective power supply antennas. For example, as in a power supply apparatus 600 of a first modification illustrated in FIG. 11 and FIG. 12, the power supply apparatus 600 may comprise a plurality of (four) power supply antennas 602 and the power supply apparatus 600 may be feeds the power receiving apparatus 200 from respective power supply antennas 602.

Figure 11:
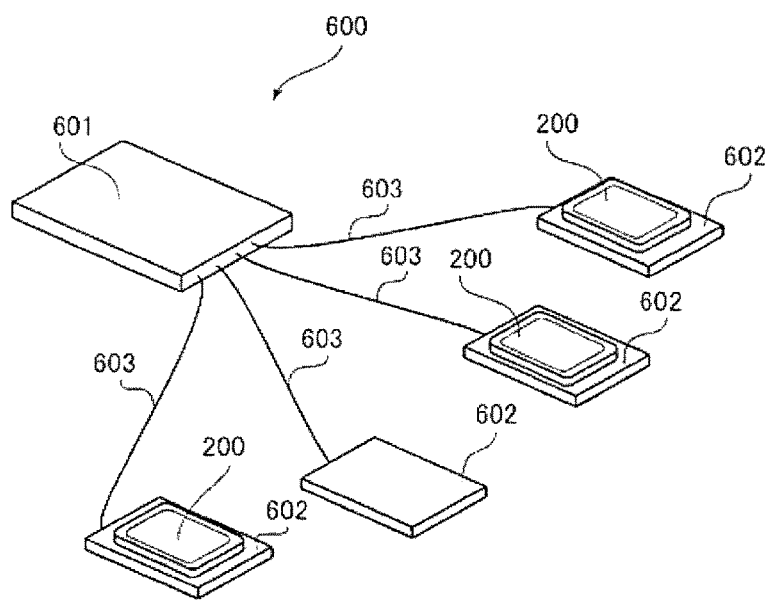
FIG. 11 is a perspective view illustrating a configuration of a power supply apparatus according to one or more embodiments of a first modification of the first to fourth examples of the present invention.

As illustrated in FIG. 11, the power supply apparatus 600 according to one or more embodiments of the first modification of the present invention comprises a power supply apparatus main body 601 and the four power supply antennas 602. Moreover, the power supply apparatus main body 601 and the four power supply antennas 602 are connected by four cables 603. Moreover, the power supply apparatus 600 is feeds the power receiving apparatus 200 disposed near the power supply antenna 602.

Figure 12:
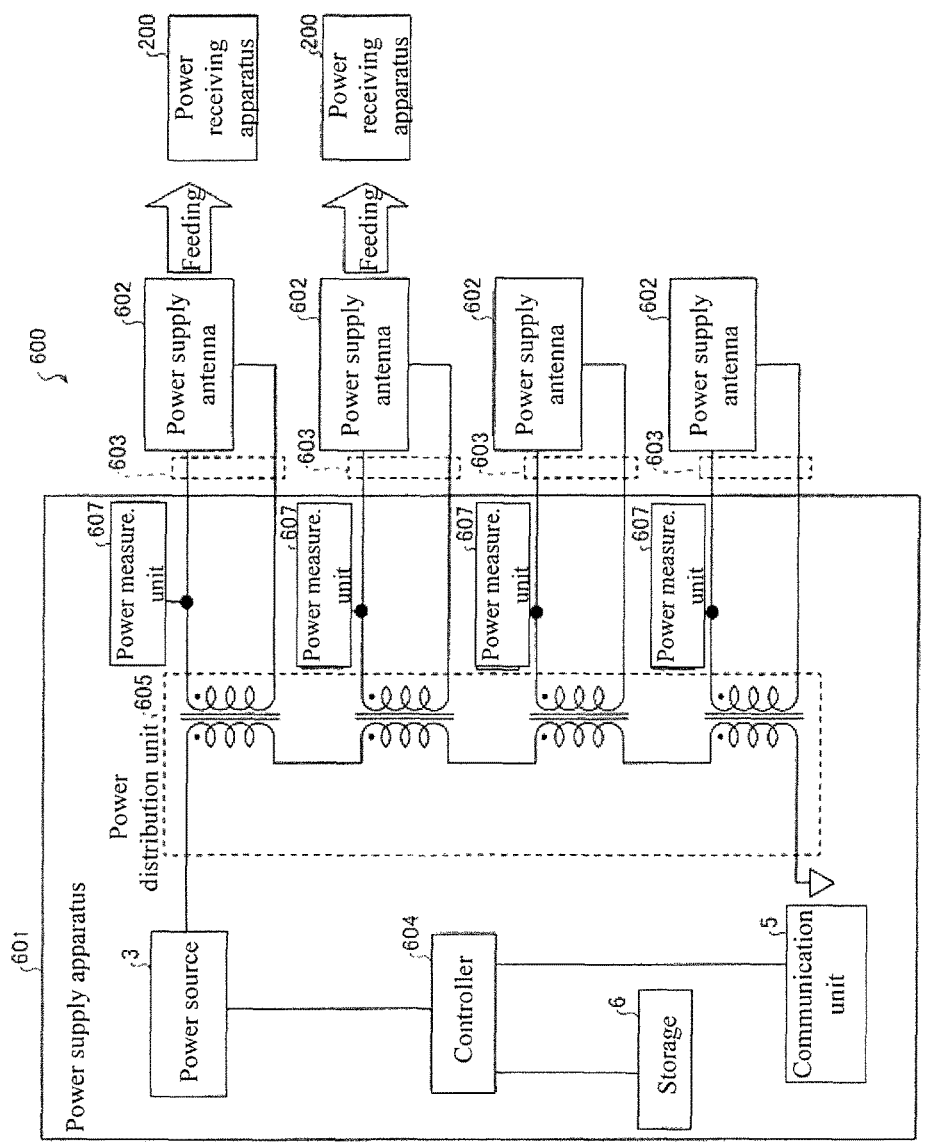
FIG. 12 is a block diagram illustrating a configuration of the power supply apparatus according to one or more embodiments of the first modification of the first to fourth examples of the present invention.

Furthermore, as illustrated in FIG. 12, the power supply apparatus 600 comprises a power distribution unit 605 between the power source 3 and the power supply antenna 602. The power distribution unit 605 is configured by, for example, a transformer whose primary side is connected in series. Moreover, the power distribution unit 605 distributes and supplies power from the power source 3 to the power supply antenna 602.

Furthermore, the power supply apparatus 600 comprises four power measurement units 607. The four power measurement units 607 are respectively disposed between the power distribution unit 605 and the four power supply antennas 602. By this, the power supply apparatus 600 is able to acquire the power value P of the four power supply antennas 602, respectively.

Furthermore, the power supply apparatus 600 comprises a controller 604, and the controller 604 acquires the power value P fed to the power receiving apparatus 200 to which the maximum load command signal is sent and perform the feeding propriety determination control (see FIG. 4) based on the acquired power value P.

Furthermore, in one or more embodiments of the second and third examples of the present invention, an example is illustrated (FIG. 7) where the power supply apparatus comprises an impedance measurement unit and a controller performs a feeding propriety determination control in a situation where newly-acquired identification information is identical to identification information acquired in advance and the situation where the change amount V of the measurement value of the impedance Z corresponding to the newly-acquired identification information relative to the impedance Z corresponding to the identification information acquired in advance is greater than the threshold Vt1, but the present invention is not limited thereto. For example, as in a power supply apparatus 700 according to one or more embodiments of a second modification of the present invention illustrated in FIG. 13 and FIG. 14, a controller 704 may perform the feeding propriety determination control (see FIG. 4) in the situation where the newly-acquired identification information is identical to the identification information acquired in advance and a situation where a change amount PV of the power value P supplied from the power source 3 to power supply antenna 2 corresponding to the newly-acquired identification information relative to the power value P supplied from the power source 3 to the power supply antenna 2 corresponding to the identification information acquired in advance is greater than a threshold Pt. Note that the threshold Pt is one example of "third threshold" in the claims.

Figure 13:
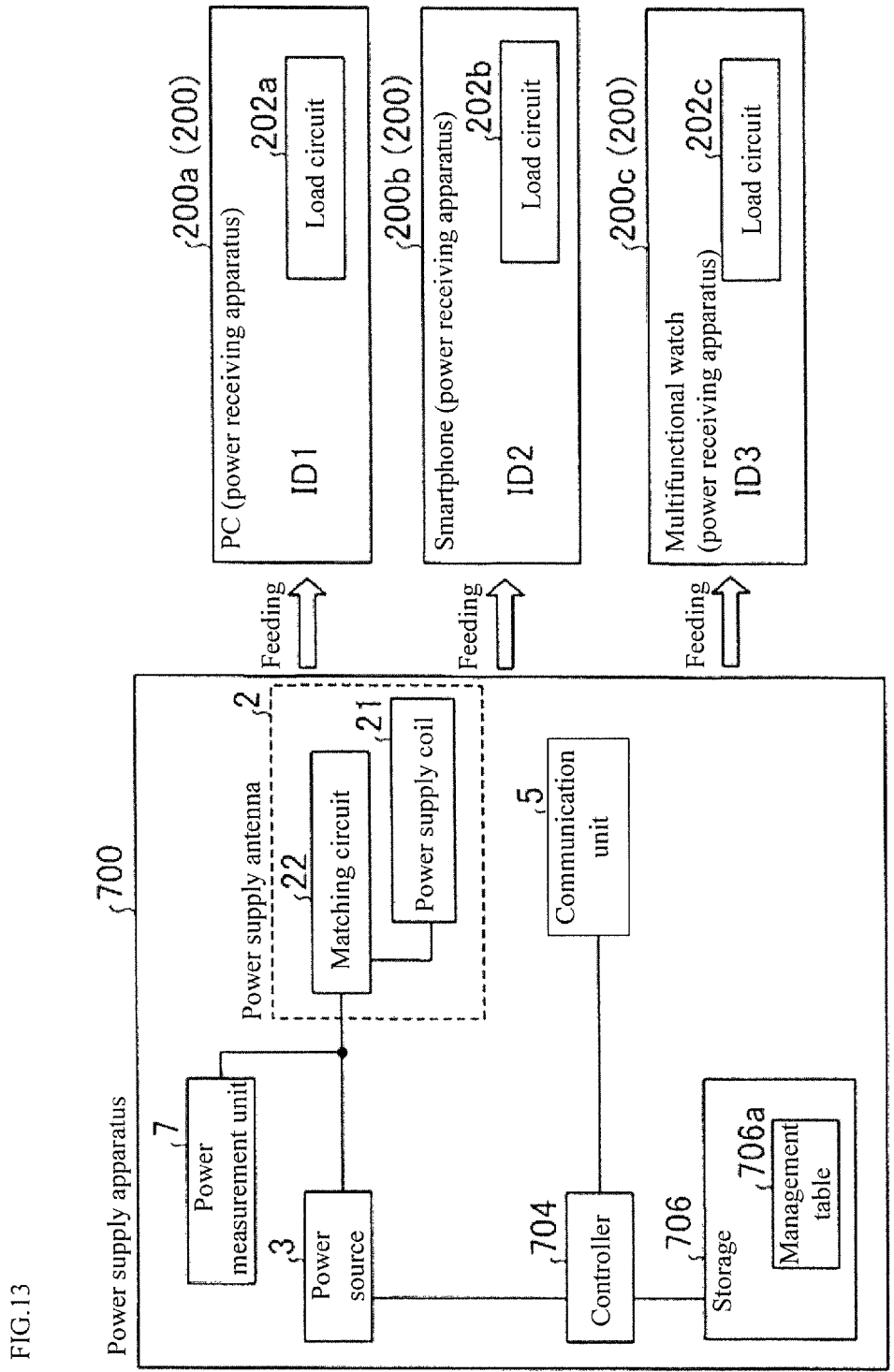
FIG. 13 is a block diagram illustrating a configuration of a power supply apparatus according to one or more embodiments of a second modification of the first to fourth examples of the present invention.

As illustrated in FIG. 13 and FIG. 14, the power supply apparatus 700 according to one or more embodiments of the second modification of the present invention includes the controller 704 and a storage 706. Moreover, the controller 704 performs the feeding propriety determination control (see FIG. 4) in the situation where the newly-acquired identification information (defined as ID1) is identical to the identification information acquired in advance (identification information included in a management table 706a stored in the storage 706) and the situation where the change amount PV (=|P12−P11|) of the power value P (defined as P12) supplied from the power source 3 to the power supply antenna 2 corresponding to the newly-acquired identification information relative to the power value P (defined as P11) supplied from the power source 3 to the power supply antenna 2 corresponding to the identification information acquired in advance is greater than the threshold Pt (|P12−P11|>Pt).

As a result, the power supply apparatus 700 can determine whether to perform the feeding propriety determination control (see FIG. 4) using the power measurement unit 7 provided in advance in the power supply apparatus 700; therefore, unlike a situation of determining whether to perform the feeding propriety determination control by measuring the impedance Z (see FIG. 5), there is no need to comprise an impedance measurement unit. As a result, the configuration of the power supply apparatus 700 becoming complex can be suppressed to an extent that no impedance measurement unit needs to be provided in the power supply apparatus 700.

Furthermore, in one or more embodiments of the third example of the present invention, an example is illustrated of using a display as the notification unit of the claims, but the present invention is not limited thereto. For example, a voice output unit may be used as the notification unit. In this situation, a request is notified to a user to correct a placement of the power receiving apparatus by a voice being output from the voice output unit.

Furthermore, in one or more embodiments of the first to fourth examples of the present invention, for the sake of convenience, the processing of the controller according to one or more embodiments of the present invention is described using a flowchart of a flow-driven type where the processing is performed in order along a processing flow, but the present invention is not limited thereto. In one or more embodiments of the present invention, a processing operation of the controller may be performed by processing of an event-driven type where processing is executed by event. In this situation, the processing may be completely event-driven or a combination of event driving and flow driving.

Furthermore, in one or more embodiments of the first example of the present invention, an example is illustrated of configuring the controller to respectively and sequentially send a maximum load command signal to all a plurality of power receiving apparatuses, but the present invention is not limited thereto. That is, it is sufficient for the controller to send a load disconnect signal to at least one power receiving apparatus among the plurality of power receiving apparatuses and stop supply of power at or above a power amount corresponding to information on a category.

FIFTH EXAMPLE

Figure 15:
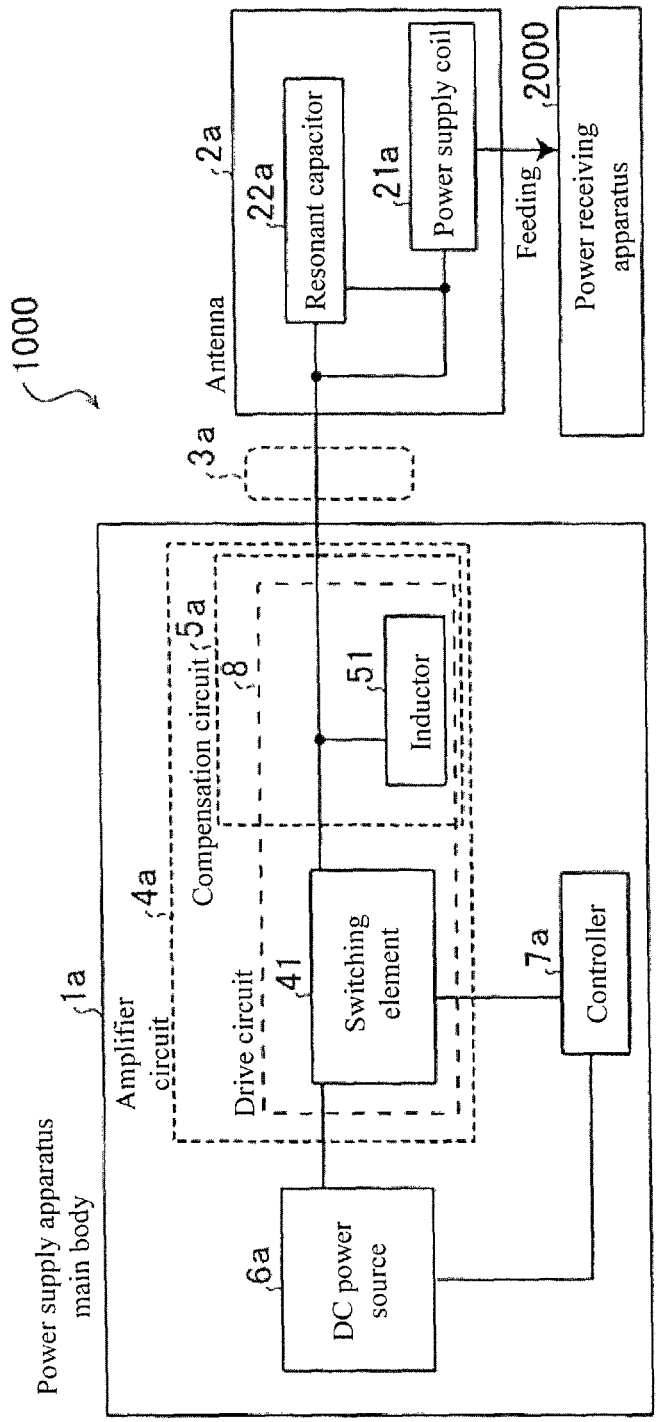
FIG. 15 is a block diagram illustrating an overall configuration of a power supply apparatus according to one or more embodiments of a fifth example of the present invention.
Figure 16:
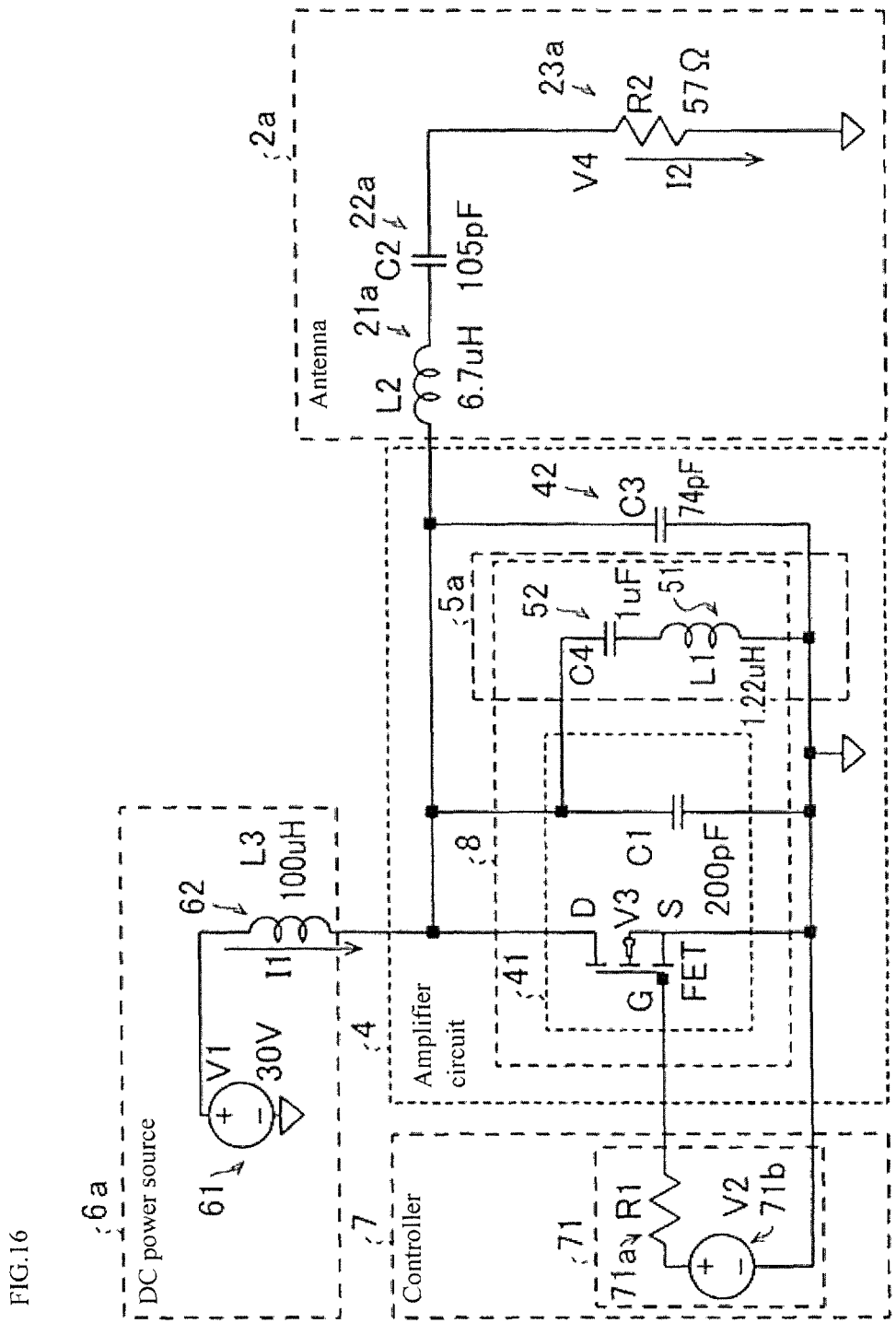
FIG. 16 is a circuit diagram illustrating a configuration of the power supply apparatus according to one or more embodiments of the fifth example of the present invention.

A configuration of a power supply apparatus 1000 according to one or more embodiments of a fifth example of the present invention is described with reference to FIG. 15 to FIG. 19. As illustrated in FIG. 15 and FIG. 16, the power supply apparatus 1000 according to one or more embodiments of the fifth example of the present invention is configured as a power source apparatus including a so-called E-class amplifier circuit that can perform zero-voltage switching. Moreover, the power supply apparatus 1000 supplies power to a power receiving apparatus 2000 disposed near the power supply apparatus 1000 using a magnetic resonance method without providing wiring, a contact point, or the like between the power supply apparatus 1000 and a power receiving apparatus 2000 (as a wireless power supply apparatus or a non-contact-point power supply apparatus). Note that the power receiving apparatus 2000 is an example of "external power receiving apparatus" of one or more embodiments of the present invention.

(Overall Configuration of Power Supply Apparatus)

As illustrated in FIG. 15, the power supply apparatus 1000 comprises a power supply apparatus main body 1a and an antenna 2a. The power supply apparatus main body 1a and the antenna 2a are connected via a cable 3a. Moreover, the power supply apparatus 1000 supplies power from the power supply apparatus main body 1a to the antenna 2a via the cable 3a. Note that the antenna 2a is an example of "power supply antenna" and "resonant circuit" of one or more embodiments of the present invention.

As illustrated in FIG. 15, the power supply apparatus main body 1a comprises an amplifier circuit 4a, and the amplifier circuit 4a includes a compensation circuit 5a. Moreover, the power supply apparatus main body 1a comprises a DC power source 6a and a controller 7a. As illustrated in FIG. 16, the amplifier circuit 4a is switched at a predetermined drive frequency fd and includes a switching element 41 having a parasitic capacitance C1. The compensation circuit 5a is connected in parallel to the switching element 41 and includes an inductor 51 having a predetermined inductance L1. Moreover, the power supply apparatus 1000 supplies power from the DC power source 6a to the antenna 2a via the amplifier circuit 4a and the compensation circuit 5a. Moreover, the power supply apparatus 1000 is configured as a single-end power source apparatus including one amplifier circuit 4a.

The antenna 2a comprises a power supply coil 21a, which is connected to the amplifier circuit 4a via the cable 3a, and a resonant capacitor 22a. The power supply coil 21a generates an AC powered magnetic field having the drive frequency fd by power supplied from an amplifier-circuit 4a side and supply power to the power receiving apparatus 2000. Moreover, the power supply coil 21a has an inductance L2. The resonant capacitor 22a forms a resonant circuit together with the power supply coil 21a and is set with a capacitance C2 to match an impedance of the resonant circuit and an impedance of the cable 3a. Moreover, in FIG. 16, an internal resistance of the power supply coil 21a and the resonant capacitor 22a is illustrated as an internal resistance 23a. Note that the power supply coil 21a is an example of "power supply antenna" in one or more embodiments of the present invention.

The power receiving apparatus 2000 includes a power receiving antenna and the like and consists of, for example, a smartphone. Moreover, the power receiving antenna of the power receiving apparatus 2000 receives power from the power supply apparatus 1000 by coupling with the powered magnetic field of the power supply coil 21a.

In one or more embodiments of the fifth example of the present invention, the compensation circuit 5a has the inductance L1 set so a resonant frequency fr of a drive circuit 8 formed by the switching element 41 and the compensation circuit 5a is greater than the drive frequency fd and no more than 3.7 times the drive frequency. More specifically, the compensation circuit 5a has the inductance L1 set so the resonant frequency fr of the drive circuit 8 is 1.5 times the drive frequency fd.

(Configuration of Each Unit of Power Supply Apparatus)

The DC power source 6a acquires power from an external commercial power source (not illustrated) or a battery unit (not illustrated). Moreover, as illustrated in FIG. 16, the DC power source 6a includes a power conversion unit 61 and a choke coil 62. The power conversion unit 61 converts the acquired power value into power having a DC voltage value V1 based on a command of the controller 7a. The choke coil 62 has an inductance L3 and makes a current value of power acquired from the power conversion unit 61 substantially constant at a current value I1.

The controller 7a comprises a gate drive circuit 71 that includes a gate resistor 71a having a resistance value R1 and a pulse generator 71b that has the drive frequency fd and generates a pulse having a voltage value V2.

The amplifier circuit 4a includes the switching element 41 and a shunt capacitor 42. The switching element 41 is configured as, for example, an FET (field-effect transistor) having the parasitic capacitance C1. A gate (G) of the switching element 41 is connected to the gate drive circuit 71 and turns on an off a connection between a drain (D) and a source (S) of the switching element 41 by acquiring a gate drive signal from the gate drive circuit 71 (controller 7a). The drain of the switching element 41 is connected to the DC power source 6a. The source of the switching element 41 is grounded. Note that while in FIG. 16 the FET and the parasitic capacitance C1 are illustrated separately for the sake of description, the parasitic capacitance C1 is included in the FET.

The shunt capacitor 42 has a capacitance C3. Moreover, the shunt capacitor 42 is connected in parallel to the switching element 41.

The power supply coil 21a of the antenna 2a is connected to a drain terminal of the switching element 41 of the amplifier circuit 4a. Moreover, the amplifier circuit 4a supplies AC power having the drive frequency fd to the antenna 2a via the compensation circuit 5a by the switching element 41 being turned on and off by the drive frequency fd. Moreover, the internal resistance 23a of the antenna 2a includes an internal resistance in the power supply coil 21a and the resonant capacitor 22a. The internal resistance 23a has a resistance value R2, and a size of the resistance value R2 is changed by the power supply coil 21a magnetically coupling with the power receiving apparatus 2000.

(Configuration of Compensation Circuit)

The compensation circuit 5a is connected in parallel to the switching element 41. Moreover, the compensation circuit 5a includes an inductor 51 and a DC cutting capacitor 52 connected in series to the inductor 51. The DC cutting capacitor 52 has a capacitance C4 greater than the capacitance C3 of the shunt capacitor 42 and suppresses a DC current from flowing in the compensation circuit 5a.

In one or more embodiments of the fifth example of the present invention, the switching element 41 and the compensation circuit 5a form the drive circuit 8. Moreover, the inductance L1 of the inductor 51 of the compensation circuit 5a is set so the resonant frequency fr of the drive circuit 8 is greater than the drive frequency fd and no more than 3.7 times the drive frequency fd. In this situation, by simulation results described below, it is determined that a power efficiency η becomes greater than a situation of configuring the inductance L1 so the resonant frequency fr of the drive circuit 8 and the drive frequency fd become identical (equal).

Furthermore, a specific value of the inductance L1 where the resonant frequency fr is greater than the drive frequency fd and no more than 3.7 times the drive frequency fd is, for example, a value 0.201 µH or more and less than 2.76 µH in a situation where the drive frequency fd is made to be 6.78 MHz and the parasitic capacitance C1 of the switching element 41 is made to be 200 pF.

Furthermore, in one or more embodiments of the fifth example of the present invention, the inductance L1 is set so the resonant frequency fr of the drive circuit 8 is no less than 1.4 times and no more than 2.2 times the drive frequency fd. In this situation, by the simulation results described below, it is determined that the power efficiency η becomes 90% or more.

Furthermore, a specific value of the inductance L1 where the resonant frequency fr is no less than 1.4 times and no more than 2.2 times the drive frequency fd is, for example, a value 0.569 µH or more and 1.41 µH or less in the situation where the drive frequency fd is made to be 6.78 MHz and the parasitic capacitance C1 of the switching element 41 is made to be 200 pF.

Figure 17:
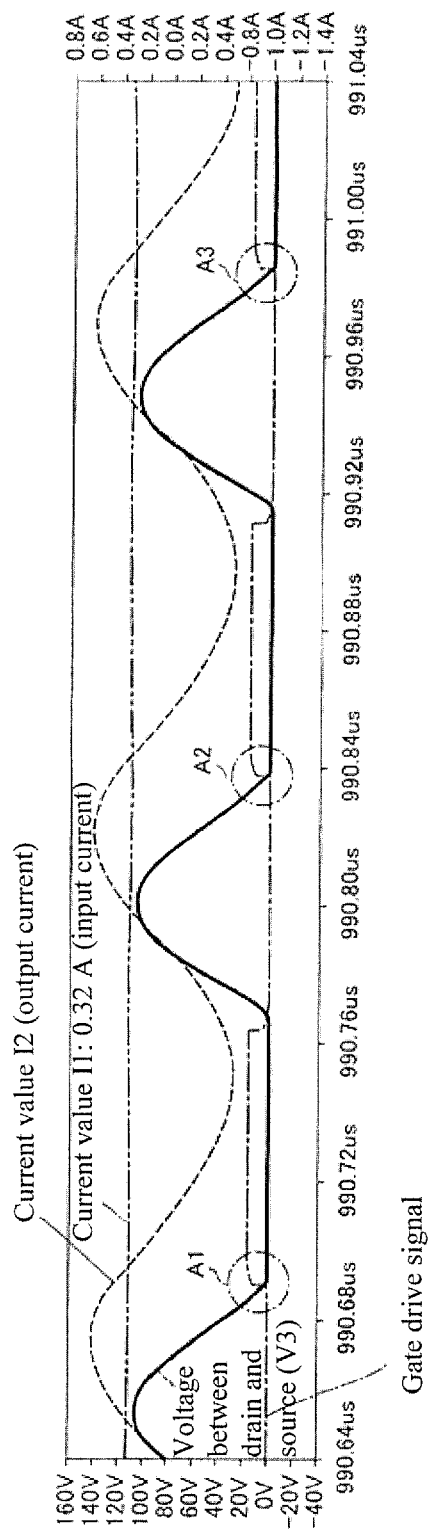
FIG. 17 is a diagram illustrating a waveform of power of the power supply apparatus according to one or more embodiments of the fifth example of the present invention.

Furthermore, in one or more embodiments of the fifth example of the present invention, as illustrated in FIG. 17, the inductance L1 is set to have the resonant frequency fr no less than 1.5 and no more than 3.7 times the drive frequency fd so a voltage value V3 between the drain and the source applied to the switching element 41 becomes substantially zero when the switching element 41 is switched (see reference signs A1 to A3 in FIG. 17). In FIG. 17, the inductance L1 indicates a waveform of a situation where the resonant frequency fr of the drive circuit 8 iscome 1.5 times the drive frequency fd. Note that by the simulation results described below, it is determined that in the situation where the resonant frequency fr of the drive circuit 8 is 1.5 times the drive frequency fd, when the switching element 41 is switched and when the voltage value V3 between the drain and the source becomes substantially zero substantially match and it is possible to generate an ideal voltage waveform for zero-voltage switching the switching element 41.

Furthermore, a specific value of the inductance L1 where the resonant frequency fr becomes no less than 1.5 and no more than 3.7 times the drive frequency fd is a value 0.201 µH or more and 1.22 µH or less in the situation where the drive frequency fd is made to be 6.78 MHz and the parasitic capacitance C1 of the switching element 41 is made to be 200 pF. Moreover, a specific value of the inductance L1 where the resonant frequency fr becomes 1.5 times the drive frequency fd is 1.22 µH.

Next, it is described with reference to FIGS. 18A-18D how in the power supply apparatus 1000 in a situation where the resonant frequency fr of the drive circuit 8 becomes 1.5 times the drive frequency fd it is possible to generate the ideal voltage waveform for zero-voltage switching the switching element 41.

FIG. 18A illustrates a waveform of the gate drive signal input to the switching element 41. The ideal voltage waveform for zero-voltage switching the switching element 41 is a waveform such as is illustrated in FIG. 18D where the voltage value V3 is 0 and a slope of the voltage value V3 (dV3/dt) is 0 when the switching element 41 is switched (reference sign A4). In a situation of this waveform, the power efficiency η becomes maximal.

Furthermore, in the power supply apparatus 1000 according to one or more embodiments of the fifth example of the present invention, because the resonant frequency fr of the drive circuit 8 is 1.5 times the drive frequency fd, a waveform of the voltage value V3 such as is illustrated in FIG. 18B is generated. Meanwhile, because with the switching element 41 a waveform arises such as is illustrated in FIG. 18C of a ramp wave shape arising due to being charged at the parasitic capacitance C1, in the power supply apparatus 1000 according to one or more embodiments of the fifth example of the present invention, the voltage waveform of FIG. 18B and the voltage waveform of FIG. 18C are synthesized. As a result, in the power supply apparatus 1000 according to one or more embodiments of the fifth example of the present invention, in the situation where the resonant frequency fr is 1.5 times the drive frequency fd, the voltage waveform of FIG. 18D is generated.

(Simulation Results)

Next, results of a simulation performed to compare the situation where the inductance L1 is set so the resonant frequency fr of the drive circuit 8 in the power supply apparatus 1000 according to one or more embodiments of the fifth example of the present invention is greater than the drive frequency fd and no more than 3.7 times the drive frequency fd (fifth example) and a situation where the resonant frequency fr is equal to (1.0 times) the drive frequency fd (comparative example) are described with reference to FIG. 16, FIG. 17, FIG. 19, and FIG. 20. Note that the configuration of the power supply apparatus 1000 according to one or more embodiments of the fifth example of the present invention and a configuration of a power supply apparatus according to the comparative example are similarly configured other than a size of the inductance L1.

In this simulation, as illustrated in FIG. 16, the simulation is performed with the drive frequency fd as 6.78 MHz, the parasitic capacitance C1 of the switching element 41 as 200 pF, the voltage value V1 of the DC power source 6a as 30

V, the inductance L2 of the power supply coil 21a as 6.7 µH, the capacitance C2 of the resonant capacitor 22a as 105 pF, the inductance L3 of the choke coil 62 as 100 µH, the capacitance C3 of the shunt capacitor 42 as 74 pF, the capacitance C4 of the DC cutting capacitor 52 as 1 µF, and the load value R2 of the internal resistance 23a as 57Ω.

(Simulation Results of Power Efficiency)

Comparison results of the power efficiency η between the power supply apparatus 1000 according to one or more embodiments of the fifth example of the present invention and the power supply apparatus according to the comparative example are described. As illustrated in FIG. 16, the power efficiency η is calculated as a ratio of output power value P2 represented as the product of a voltage value V4 at the antenna 2a supplied from the amplifier circuit 4a and a current value I2 relative to input power value P1 supplied from the DC power source 6a to the amplifier circuit 4a represented by the product of the voltage value V1 and the current value I1 (P2/P1=(V4×I2)/(V1×I1)).

Figure 19:
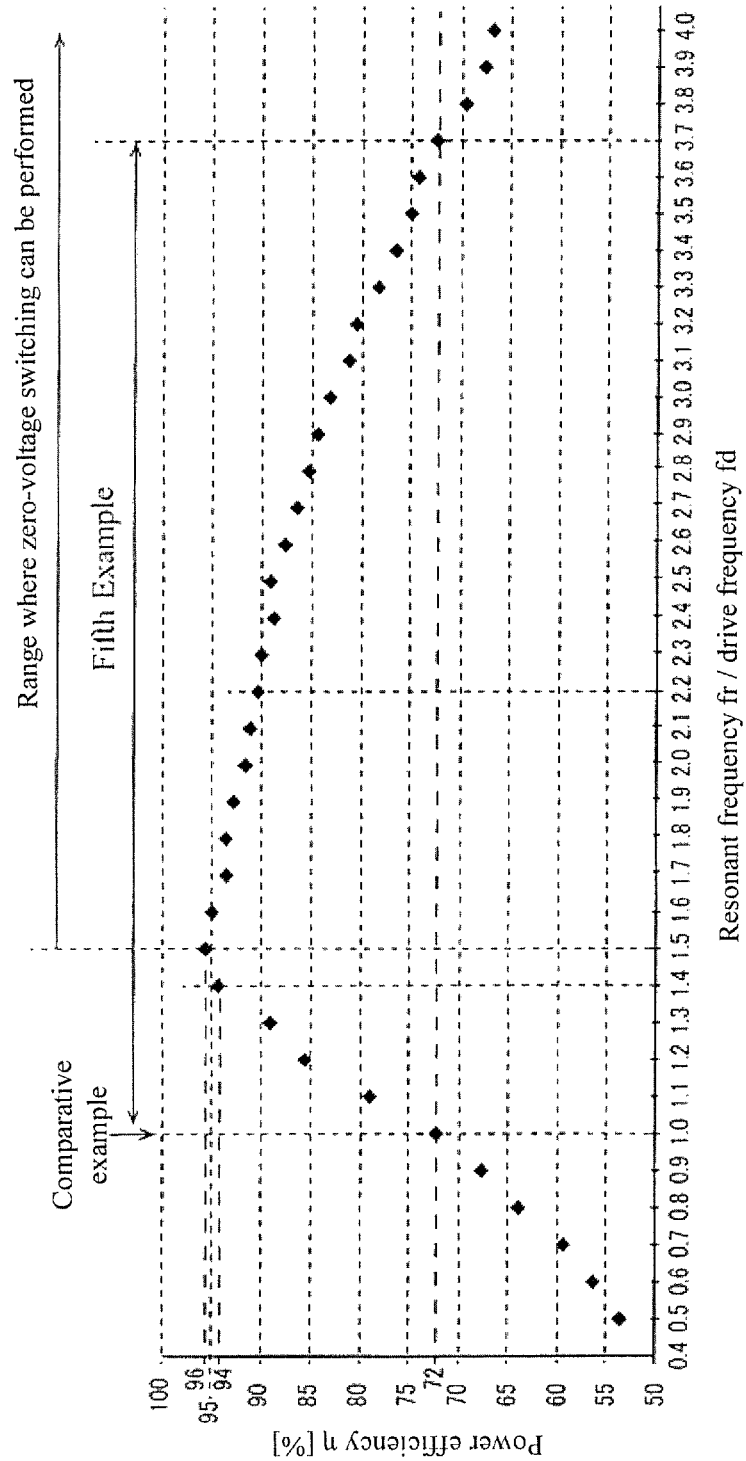
FIG. 19 is a diagram for describing simulation results of the power supply apparatus according to one or more embodiments of the fifth example of the present invention.

Then, as illustrated in FIG. 19, the power efficiency η is calculated by changing the inductance L1 of the compensation circuit 5a at increments of 0.1 times so the resonant frequency fr has frequencies 0.5 times to 4.0 times the drive frequency fd.

As a result of the simulation (calculation), in the power supply apparatus according to the comparative example where the resonant frequency fr and the drive frequency fd are equal (identical), the power efficiency η became 72.2%.

Furthermore, in a situation where the resonant frequency fr is less than the drive frequency fd, the power efficiency η became a value less than 72.2%. Specifically, it became 53.58%, 56.31%, 59.35%, 63.89%, and 67.66% when the resonant frequency fr is 0.5 times, 0.6 times, 0.7 times, 0.8 times, and 0.9 times the drive frequency fd, respectively.

Meanwhile, in the power supply apparatus 1000 according to one or more embodiments of the fifth example of the present invention, the power efficiency η became greater than 72.2%. That is, in the situation where the resonant frequency fr is greater than the drive frequency fd and no more than 3.7 times the drive frequency fd, the power efficiency η became greater than 72.2%. Moreover, in the situation where the resonant frequency fr is no less than 1.4 times and no more than 2.2 times the drive frequency fd, the power efficiency η became greater than 90%. Moreover, in the situation where the resonant frequency fr is 1.5 times the drive frequency fd, the power efficiency η became 95.61%, which is the greatest value among these simulation results.

Specifically, it became 78.92%, 85.55%, 88.98%, 94.30%, 95.61%, 94.95%, 94.43%, 93.43%, 93.51%, 92.74%, 91.56%, 90.30%, 89.98%, 88.70%, 89.06%, 87.57%, 89.06%, 87.57%, 86.39%, 83.12%, 81.22%, 80.46%, 78.22%, 76.44%, 74.90%, 74.19%, and 72.36% when the resonant frequency fr is 1.1 times, 1.2 times, 1.3 times, 1.4 times, 1.5 times, 1.6 times, 1.7 times, 1.8 times, 1.9 times, 2.0 times, 2.1 times, 2.2 times, 2.3 times, 2.4 times, 2.5 times, 2.6 times, 2.7 times, 2.8 times, 2.9 times, 3.0 times, 3.1 times, 3.2 times, 3.3 times, 3.4 times, 3.5 times, 3.6 times, and 3.7 times the drive frequency fd, respectively.

Furthermore, it became 69.57%, 67.61%, and 66.78% when the resonant frequency fr is 3.8 times, 3.9 times, and 4.0 times—values greater than 3.7 times—the drive frequency fd, respectively. Note that it is thought that the feeding efficiency η becomes comparatively small when the resonant frequency fr is a value greater than 3.7 times the drive frequency fd because a period arises between the voltage value V3 becoming substantially zero and the switching element 41 switching and power loss arises in this period.

From the results above, it is determined that in the power supply apparatus 1000 according to one or more embodiments of the fifth example of the present invention, the power efficiency η increases compared to the power supply apparatus according to the comparative example, where the resonant frequency fr and the drive frequency fd are equal, in the situation where the resonant frequency fr is greater than the drive frequency fd and no more than 3.7 times the drive frequency fd. Moreover, it is determined that in the power supply apparatus 1000 according to one or more embodiments of the fifth example of the present invention the power efficiency η becomes greater than 90% in the situation where the resonant frequency fr is no less than 1.4 times and no more than 2.2 times the drive frequency fd. Moreover, it is determined in the power supply apparatus 1000 according to one or more embodiments of the fifth example of the present invention that the power efficiency η becomes the greatest value in the situation where the resonant frequency fr is 1.5 times the drive frequency fd.

(Simulation Results of Voltage Waveform and Current Waveform)

Comparison results of the voltage waveform and a current waveform of the power supply apparatus 1000 according to one or more embodiments of the fifth example of the present invention (see FIG. 17) and a voltage waveform and a current waveform of the power supply apparatus according to the comparative example (see FIG. 20) are described.

Figure 20:
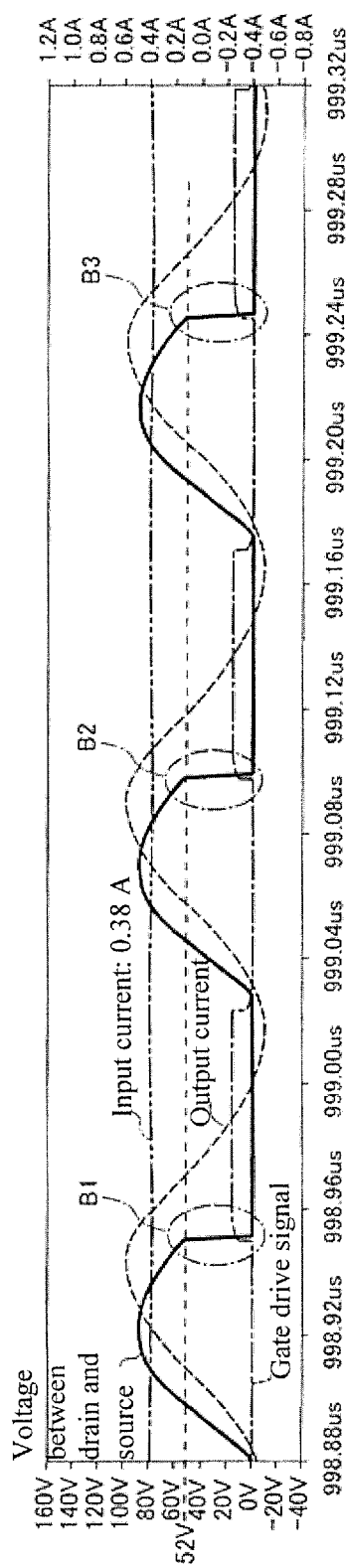
FIG. 20 is a diagram illustrating a waveform of power of a power supply apparatus according to a comparative example.

FIG. 20 illustrates as the voltage waveform and the current waveform of the power supply apparatus according to the comparative example a voltage waveform and a current waveform in the situation where the resonant frequency fr is made to be 1.0 times (equal to) the drive frequency fd.

As a result of the simulation, the gate drive signal is input to the switching element and the switching element is switched in a state where the voltage value applied to the switching element has 52 V (see reference signs B1 to B3 in FIG. 20). That is, in the power supply apparatus according to the comparative example, zero-voltage switching was not performed.

FIG. 17 illustrates as the voltage waveform and the current waveform of the power supply apparatus 1000 according to one or more embodiments of the fifth example of the present invention a voltage waveform and a current waveform in the situation where the resonant frequency fr is made to be 1.5 times the drive frequency fd.

As a result of the simulation, the gate drive signal is input to the switching element 41 and the switching element 41 is switched when the voltage value V3 applied to the switching element 41 is substantially zero (see reference signs a1 to a3 in FIG. 17). Moreover, the gate drive signal is input to the switching element 41 and the switching element 41 is switched immediately after the voltage value V3 applied to the switching element 41 becomes substantially zero. Moreover, when the switching element 41 is switched, the slope of the voltage value V3 (dV3/dt) became substantially 0.

Furthermore, as a result of the simulation, as above, it is determined that zero-voltage switching occurs in the situation where the resonant frequency fr is made to be 1.5 times the drive frequency fd; therefore, it can be said that in the situation where the resonant frequency fr is made more than 1.5 times the drive frequency fd, the voltage V3 becomes substantially zero faster than the situation where the resonant frequency fr is 1.5 times the drive frequency fd and zero-voltage switching is possible similarly to the situation where the resonant frequency fr is 1.5 times the drive frequency fd.

From the above results, it is determined in the power supply apparatus 1000 according to one or more embodiments of the fifth example of the present invention that in the situation where the resonant frequency fr is made to be no less than 1.5 times the drive frequency fd the switching element 41 can be zero-voltage switched. That is, it is determined in the power supply apparatus 1000 according to one or more embodiments of the fifth example of the present invention that an impedance of the drive circuit 8 formed by the compensation circuit 5a and the parasitic capacitance C of the switching element 41 as seen from the amplifier circuit 4a becomes infinite, a current flowing in the parasitic capacitance C of the switching element 41 from the amplifier circuit 4a becomes substantially zero as a result, and the parasitic capacitance C of the switching element 41 can be ignored. Meanwhile, it is determined in the power supply apparatus according to the comparative example that the voltage value becomes 52 V when the switching element is switched and zero-voltage switching is difficult.

Effects of Fifth Embodiment

Effects such as below can be obtained in one or more embodiments of the fifth example of the present invention.

In one or more embodiments of the fifth example of the present invention, as above, the power supply apparatus 1000 comprises the amplifier circuit 4a that has the predetermined inductance and is switched at the predetermined drive frequency fd and the antenna 2a connected to the amplifier circuit 4a, wherein the amplifier circuit 4a has a predetermined inductance where the resonant frequency fr of the amplifier circuit 4a (drive circuit 8) is greater than the predetermined drive frequency fd and no more than 3.7 times the predetermined drive frequency. By this, by configuring the compensation circuit 5a to be set with the inductance L1 so the resonant frequency fr of the drive circuit 8 (amplifier circuit 4a) formed by the switching element 41 and the compensation circuit 5a is greater than the drive frequency fd and no more than 3.7 times the drive frequency fd, power can be efficiently supplied from the amplifier circuit 4a to the antenna 2a even in a situation of using the switching element 41 having the parasitic capacitance C1. This is confirmed by the simulation results above.

Furthermore, in one or more embodiments of the fifth example of the present invention, as above, the compensation circuit 5a (amplifier circuit 4a) has the inductance L1 where the resonant frequency fr becomes no less than 1.4 times and no more than 2.2 times the drive frequency fd. That power can be supplied the most efficiently from the amplifier circuit 4a to the antenna 2a in the situation where the compensation circuit 5a (amplifier circuit 4a) has the inductance L1 where the resonant frequency fr becomes 1.5 times the drive frequency fd is confirmed by the simulation results above; however, it is generally thought that individual variation arises in the inductance L1 of the amplifier circuit 4a and the capacitances C1 to C4. Here, it is further determined from the simulation results above that a comparatively high power efficiency η (90% or more) is obtained in the situation where the amplifier circuit 4a has the inductance L1 where the resonant frequency fr is no less than 1.4 times and no more than 2.2 times the drive frequency fd. That is, it is determined that by configuring the amplifier circuit 4a so the resonant frequency fr becomes a value on a comparatively-higher-multiplication-factor side than 1.5 times the drive frequency fd (1.8 times), a high power efficiency of 90% or more can be obtained even in a situation where individual variation arises in the inductance L1 of the amplifier circuit 4a or the capacitances C1 to C4. In consideration of this, in one or more embodiments of the fifth example of the present invention, the compensation circuit 5a (amplifier circuit 4a) has the inductance L1 where the resonant frequency fr becomes 1.8±0.4 times (no less than 1.4 times and no more than 2.2 times) the drive frequency fd; therefore, power can be supplied from the amplifier circuit 4a to the antenna 2a in a state where the power efficiency η is comparatively high at 90% or more even in the situation where individual variation arises in the inductance L1 of the amplifier circuit 4a or the capacitances C1 to C4.

Furthermore, in one or more embodiments of the fifth example of the present invention, as above, the compensation circuit 5a is configured so the voltage value V3 applied to the switching element 41 becomes substantially zero when the switching element 41 is switched (see FIG. 17) and to have the inductance L1 where the resonant frequency fr becomes no less than 1.5 and no more than 3.7 times the drive frequency fd. Because zero-switching can thereby be performed, power loss when the switching element 41 is switched can be suppressed; therefore, power can be further efficiently supplied from the amplifier circuit 4a to the antenna 2a.

Furthermore, in one or more embodiments of the fifth example of the present invention, as above, the compensation circuit 5a (amplifier circuit 4a) has the inductance L1 where the resonant frequency fr becomes 1.5 times the drive frequency fd. By this, the voltage waveform of the voltage value V3 applied to the switching element 41 becomes nearest to the ideal voltage waveform for zero-voltage switching (see FIG. 18); therefore, power can be supplied the most efficiently from the amplifier circuit 4a to the antenna 2a. This is also confirmed by the simulation results above.

SIXTH EMBODIMENT

Next, a configuration of a power supply apparatus 3000 according to one or more embodiments of a sixth example of the present invention is described with reference to FIG. 21 and FIG. 22. Unlike the power supply apparatus 1000 according to one or more embodiments of the fifth example of the present invention comprising the compensation circuit 5a including one inductor 51, the power supply apparatus 3000 according to one or more embodiments of the sixth example of the present invention comprises a compensation circuit 305a including a plurality of inductors 351a and 351b. Configurations identical to one or more embodiments of the fifth example of the present invention are labeled with the same reference signs, and description thereof is omitted.

(Configuration of Power Supply Apparatus According to Sixth Embodiment)

Figure 21:
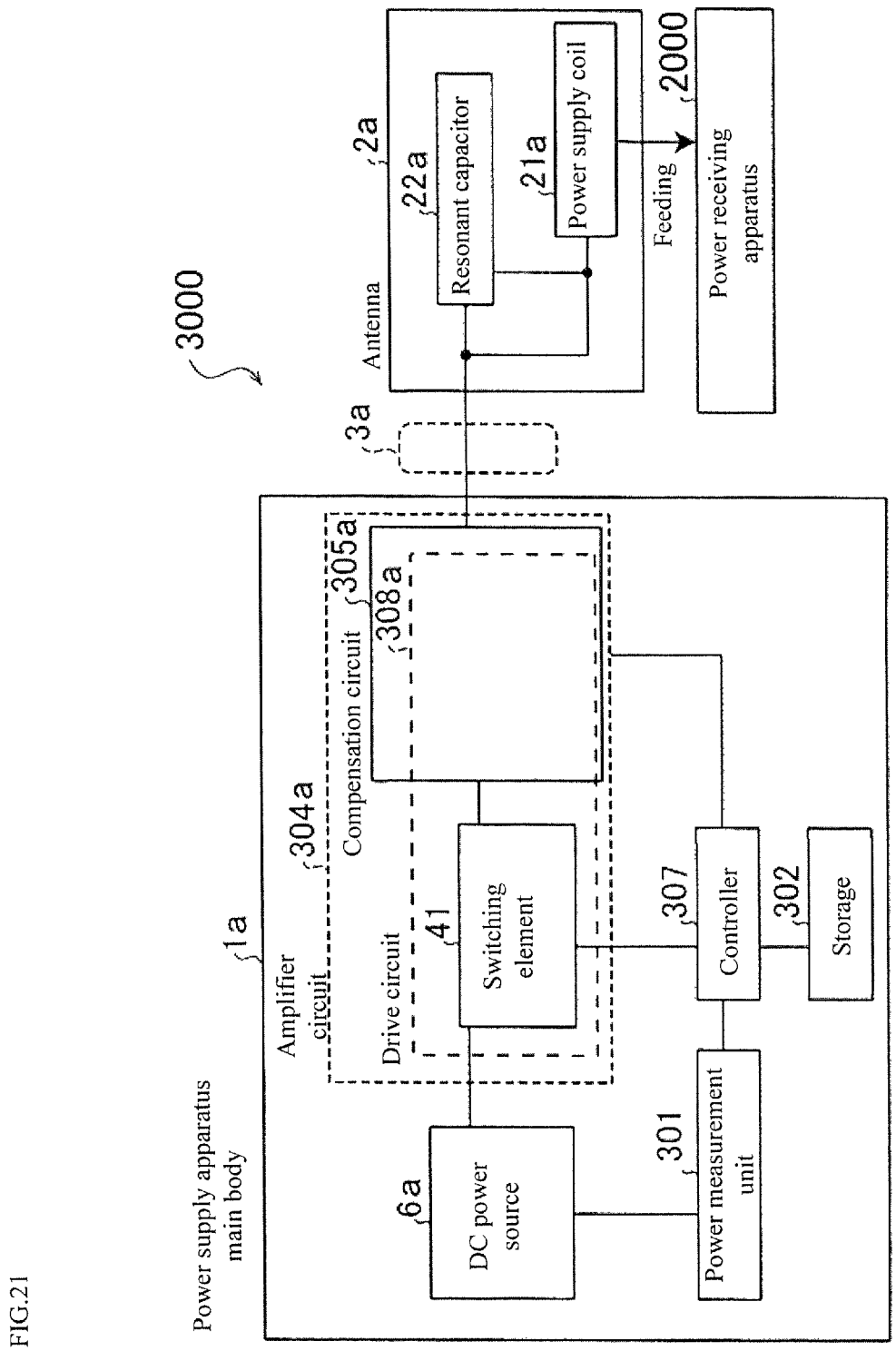
FIG. 21 is a block diagram illustrating an overall configuration of a power supply apparatus according to one or more embodiments of a sixth example of the present invention.
Figure 22:
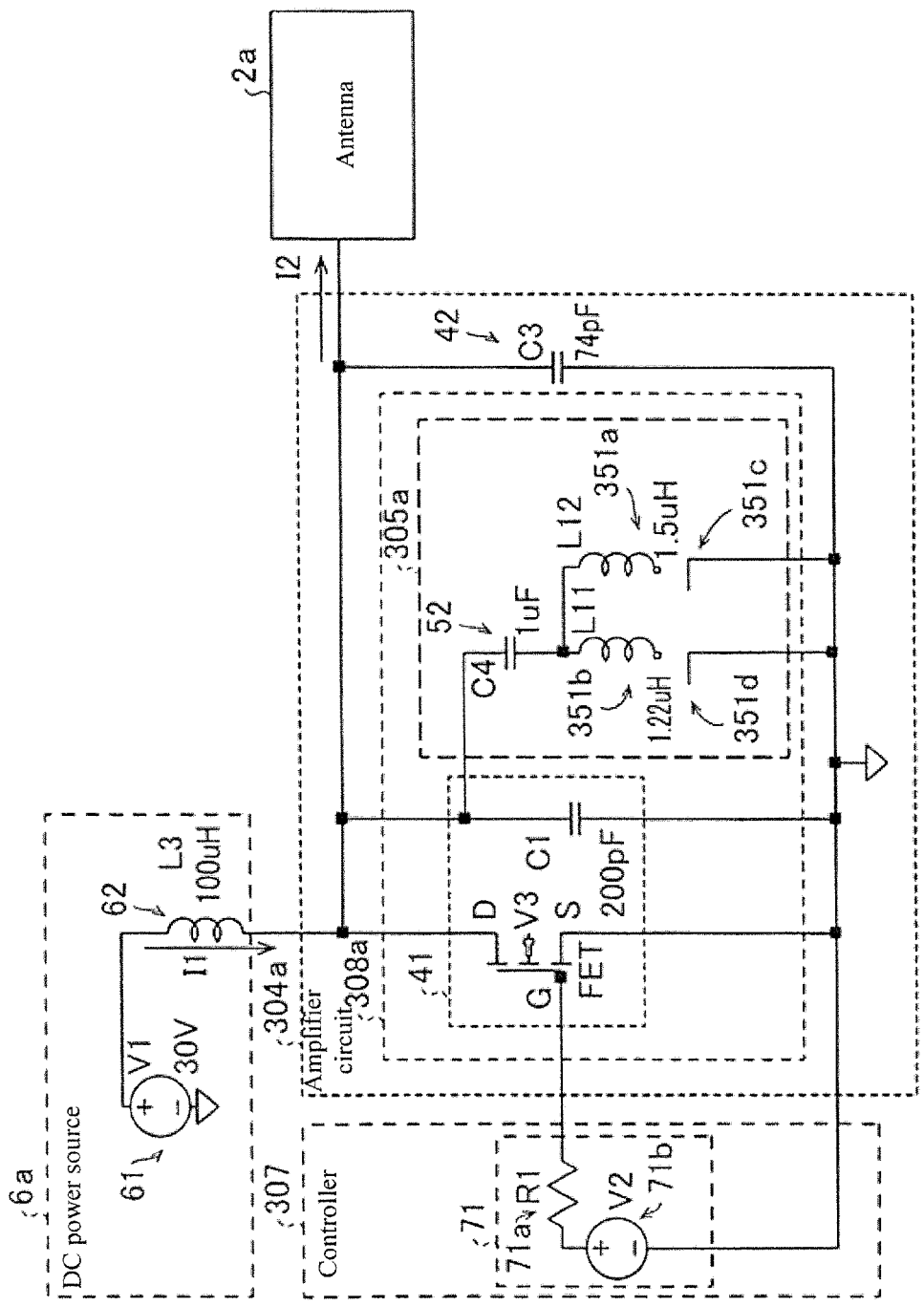
FIG. 22 is a circuit diagram illustrating a configuration of the power supply apparatus according to one or more embodiments of the sixth example of the present invention.

As illustrated in FIG. 21, the power supply apparatus 3000 according to one or more embodiments of the sixth example of the present invention includes a power measurement unit 301, a storage 302, an amplifier circuit 304a including the compensation circuit 305a, and a controller 307. Moreover, a drive circuit 308a having the resonant frequency fr is formed by the compensation circuit 305a and the switching element 41 of the amplifier circuit 304a.

Here, in one or more embodiments of the sixth example of the present invention, the compensation circuit 305a includes the plurality of inductors (a first inductor 351a and a second inductor 351b), a switch 351c that switches a connection state of the first inductor 351a, and a switch 351d that switches a connection state of the second inductor 351b.

Furthermore, in one or more embodiments of the sixth example of the present invention, the power measurement unit 301 acquires the input power value PI that is the power supplied from the DC power source 6a to the amplifier circuit 304a and the output power value P2 that is the power supplied from the amplifier circuit 304a to the antenna 2a. Moreover, the controller 307 acquires the power efficiency η of the output power value P2 relative to the input power value P1 and, based on the power efficiency η, control an operation of the switch 351c and the switch 351d so the power efficiency η increases. The storage 302 stores the acquired power efficiency η. Specific control processing of the controller 307 is described below using the flowchart in FIG. 23.

The first inductor 351a and the second inductor 351b of the compensation circuit 305a are respectively connected in series to the DC cut capacitor 52 and connected in parallel to each other. The switch 351c is connected in series to the first inductor 351a. Moreover, the switch 351d is connected in series to the second inductor 351b. Moreover, the switch 351c and the switch 351d switch between a connected state and a disconnected state based on a control signal from the controller 307.

Note that both the first inductor 351a and the second inductor 351b of the compensation circuit 305a have inductances L11 and L12 set so the resonant frequency fr of the drive circuit 308a formed by the switching element 41 and the compensation circuit 305a becomes greater than the drive frequency fd and no more than 3.7 times the drive frequency fd, similarly to the inductor 51 of the power supply apparatus 1000 according to one or more embodiments of the fifth example of the present invention. For example, the inductance L11 of the first inductor 351a is set to 1.5 µH, and the inductance L12 of the second inductor 351b is set to 1.22 µH.

Furthermore, other configurations of the power supply apparatus 3000 according to one or more embodiments of the sixth example of the present invention are similar to the power supply apparatus 1000 in one or more embodiments of the fifth example of the present invention.

(Connection Switching Control Processing of Inductor by Power Supply Apparatus of Sixth Example)

Figure 23:
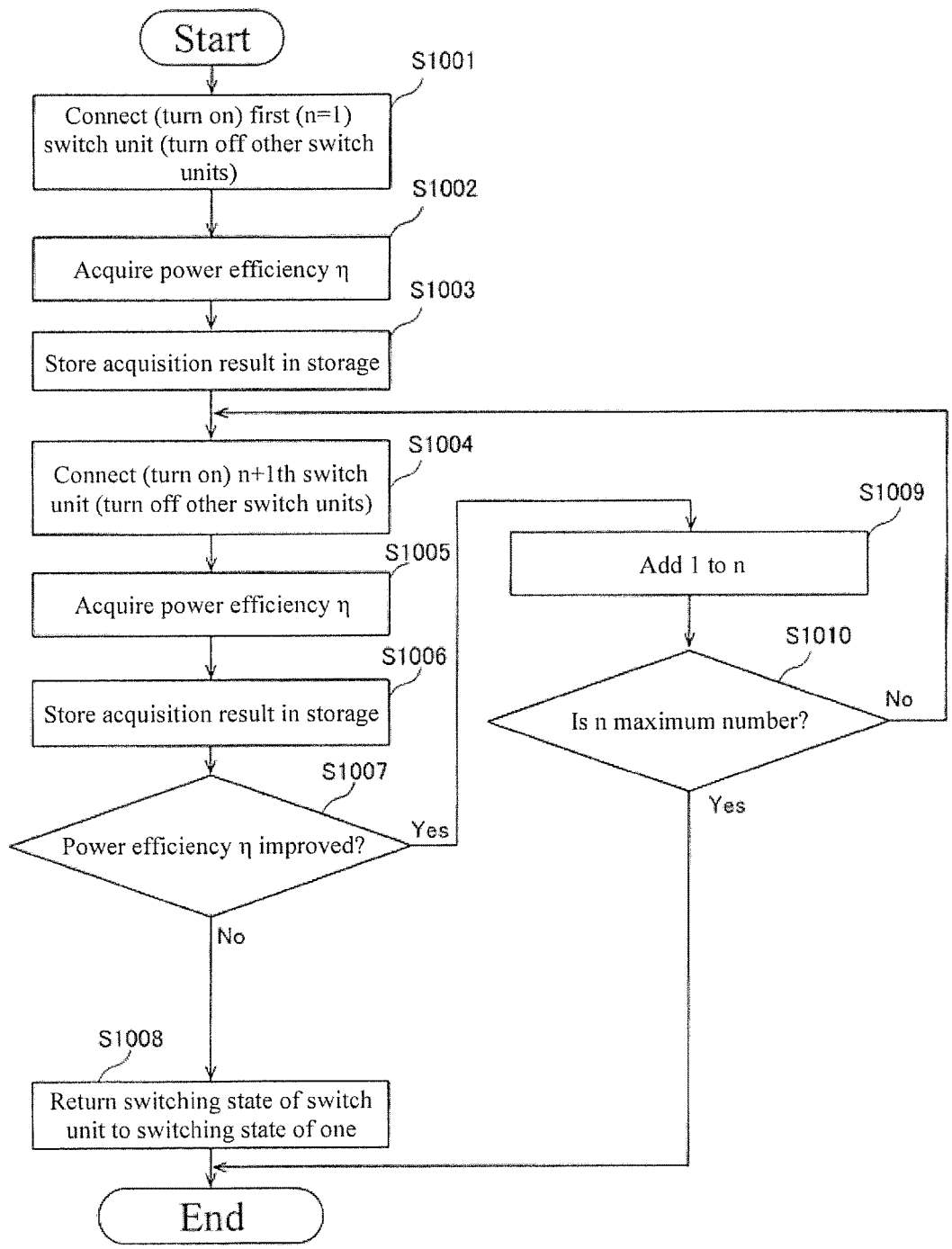
FIG. 23 is a flowchart for describing control processing of connection switching of an inductor of the power supply apparatus according to one or more embodiments of the sixth example of the present invention.

Next, a change control processing flow of communication connection by the power supply apparatus 3000 according to one or more embodiments of the sixth example of the present invention is described with reference to FIG. 23. The following control processing is executed by the controller 307. Note that in the flowchart illustrated in FIG. 23, the switch 351c and the switch 351d are respectively described as the first switch and the second switch. Moreover, n is described as an integer variable.

First, at step S1001, the first (n=1) switch is connected (turned on), and other switches are disconnected (turned off). In the situation of the above example, the switch 351c is turned on, and the switch 351d is turned off. Afterward, the processing proceeds to step S1002.

At step S1002, the power efficiency η is acquired. Afterward, the processing proceeds to step S1003.

At step S1003, the result of the acquired power efficiency η is stored in the storage 302. Afterward, the processing proceeds to step S1004.

At step S1004, an n+1$^{th}$ switch is connected (turned on), and the other switches are disconnected (turned off). In the situation of the above example, the switch 351d is turned on, and the switch 351c is turned off. Afterward, the processing proceeds to step S1005.

At step S1005, the power efficiency η is acquired. Afterward, the processing proceeds to step S1006.

At step S1006, the result of the acquired power efficiency η is stored in the storage 302. Afterward, the processing proceeds to step S1007.

At step S1007, it is determined whether the power efficiency η is improved. That is, the value of the power efficiency η acquired at step 5 and the value of the power efficiency η acquired the previous time are read from the storage 302 and compared. In a situation where the power efficiency η is improved, the processing proceeds to step S1009, and in a situation where the power efficiency η is not improved, the processing proceeds to step S1008.

At step S1008, a switching state of the switches is returned to a switching state one before. For example, in a situation where the power efficiency of the situation where the second switch is turned on (current switching state) is not improved compared to the power efficiency η of the situation where the first switch is turned on (switching state one before), it is returned to the state where the first switch is turned on that is the switching state one before. Afterward, the change control processing of communication connection by the power supply apparatus 3000 according to one or more embodiments of the sixth example of the present invention ends.

At step S1009 to which the processing proceeds in the situation where the power efficiency η is improved at step S1007, 1 is added to n. Afterward, the processing proceeds to step S1010.

At step S1010, it is determined whether n is a maximum number. In a situation where n is the maximum number, the change control processing of communication connection by the power supply apparatus 3000 according to one or more embodiments of the sixth example of the present invention ends. In a situation where n is not the maximum number, the processing returns to step S1004. In the situation of the above example, because the maximum number is 2 (the number of switches is two), it is determined whether n is 2. In a situation where n is 2, the change control processing of communication connection by the power supply apparatus 3000 according to one or more embodiments of the sixth example of the present invention ends in a state where the switch 351d is turned on and the switch 351c is turned off.

Effects of Sixth Embodiment

Effects such as below can be obtained in one or more embodiments of the sixth example of the present invention.

In one or more embodiments of the sixth example of the present invention, as above, the amplifier circuit 304a comprises the compensation circuit 305a that includes the first inductor 351a and the second inductor 351b and the switches 351c and 351d that switch the connection states of the first inductor 351a and the second inductor 351b. By this, the connection states of the first inductor 351a and the second inductor 351b can be switched by the switches 351c and 351d; therefore, the inductance of the compensation circuit 305a (amplifier circuit 304a) can be changed to the inductance L11 or L12. As a result, the inductance can be set appropriately by changing the inductance of the compensation circuit 305a even in a situation where variation arises in the respective inductances L11 and L12 of the first inductor 351a and the second inductor 351b of the compensation circuit 305a.

Furthermore, in one or more embodiments of the sixth example of the present invention, as above, the controller 307 acquires the power efficiency η of the output power value P2 that is the power supplied from the amplifier circuit 304a to the antenna 2a relative to the input power value P1 that is the power supplied from the DC power source 6a to the amplifier circuit 304a and increase the power efficiency η by controlling the operation of the switches 351c and 351d based on the power efficiency η. By this, the inductance of the compensation circuit 305a can be appropriately changed automatically by the controller 307 so the power efficiency η increases even in the situation where variation is arisen in the inductances L11 and L12 of the first inductance 351a and the second inductance 351b.

Furthermore, other effects of the power supply apparatus 3000 according to one or more embodiments of the sixth example of the present invention are similar to the power supply apparatus 1000 in one or more embodiments of the fifth example of the present invention.

SEVENTH EXAMPLE

Next, a configuration of a power supply apparatus 4000 according to one or more embodiments of a seventh example of the present invention is described with reference to FIG. 24. Unlike the power supply apparatus 1000 according to one or more embodiments of the fifth example of the present invention that includes one amplifier circuit 4a and one compensation circuit 5a and is configured as a single-end amplifier circuit, the power supply apparatus 4000 according to one or more embodiments of the seventh example of the present invention includes a differential amplifier circuit having a first amplifier circuit 404a and a second amplifier circuit 404b and a first compensation circuit 405a and a second compensation circuit 405b. Configurations identical to one or more embodiments of the fifth or sixth example of the present invention are labeled with the same reference signs, and description thereof is omitted.

(Configuration of Power Supply Apparatus According to Seventh Example)

Figure 24:
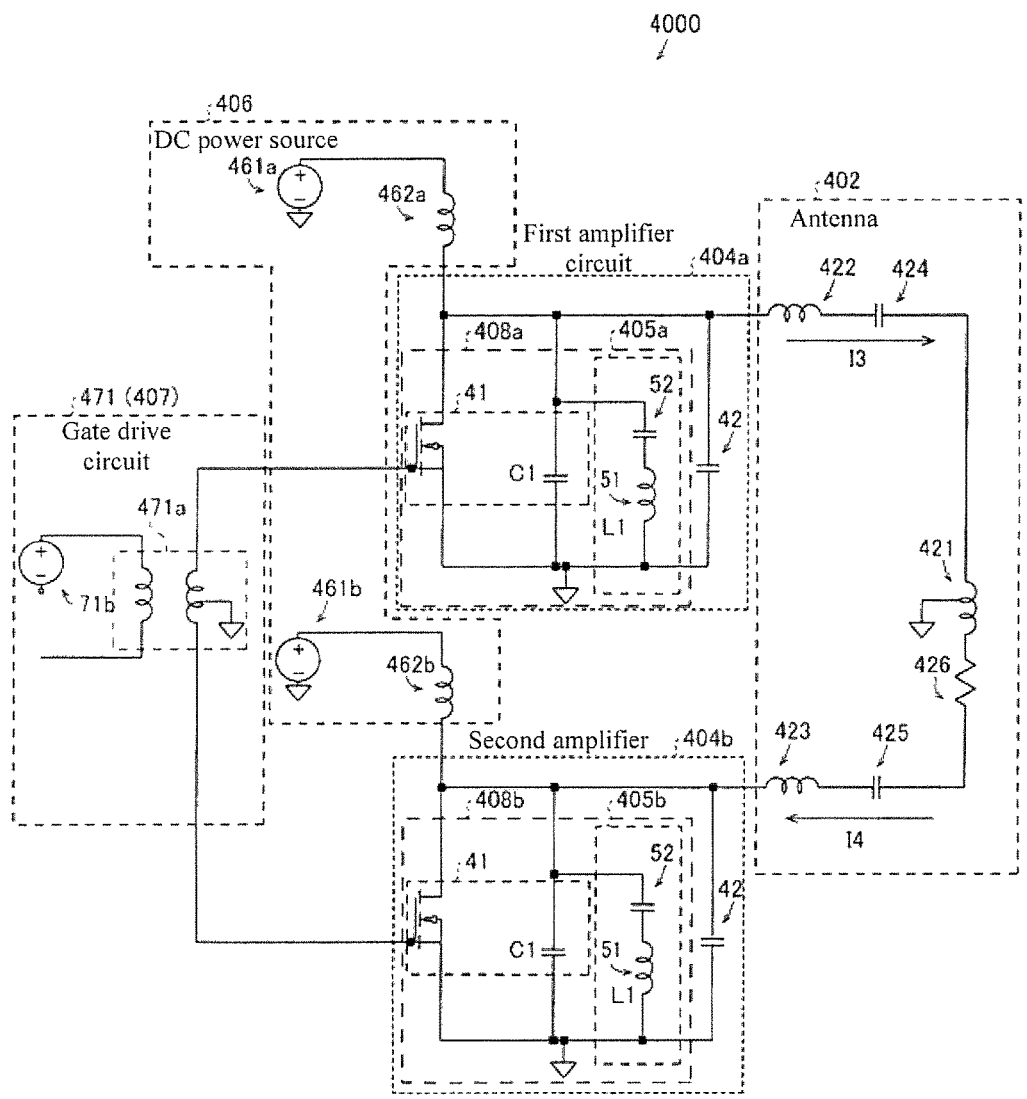
FIG. 24 is a circuit diagram illustrating a configuration of a power supply apparatus according to one or more embodiments of a seventh example of the present invention.

As illustrated in FIG. 24, the power supply apparatus 4000 according to one or more embodiments of the seventh example of the present invention comprises an antenna 402, the first amplifier circuit 404a, the second amplifier circuit 404b, the first compensation circuit 405a, the second compensation circuit 405b, a DC power source 406, and a controller 407.

In one or more embodiments of the seventh example of the present invention, the first amplifier circuit 404a and the second amplifier circuit 404b and the first compensation circuit 405a and the second compensation circuit 405b are configured as a differential amplifier circuit.

The first amplifier circuit 404a and the second amplifier circuit 404b are respectively configured similarly to the amplifier circuit 4a of the power supply apparatus 1000 according to one or more embodiments of the fifth example of the present invention. Moreover, the first compensation circuit 405a and the second compensation circuit 405b are respectively configured similarly to the compensation circuit 5a of the power supply apparatus 1000 according to one or more embodiments of the fifth example of the present invention.

Furthermore, a first drive circuit 408a is formed by the switching element 41 of the first amplifier circuit 404a and the first compensation circuit 405a. Moreover, a second drive circuit 408b is formed by the switching element 41 of the second amplifier circuit 404b and the second compensation circuit 405b.

The antenna 402 includes power supply coils 421 to 423, resonant capacitors 424 and 425, and an internal resistance 426. The power supply coils 421 to 423 are illustrated individually separated in FIG. 24 but are disposed near each other. The internal resistance 426 includes internal resistances of the power supply coils 421 to 423 and the resonant capacitors 424 and 425.

The DC power source 406 includes power conversion units 461a and 461b and choke coils 462a and 462b. Moreover, the DC power source 406 supplies DC power to the first amplifier circuit 404a and the second amplifier circuit 404b.

The controller 407 includes a gate drive circuit 471. The gate drive circuit 471 includes a transformer 471a and transmits a gate drive signal from a pulse generator to the first amplifier circuit 404a and the second amplifier circuit 404b via the transformer 471a.

The first amplifier circuit 404a, the antenna 402, and the second amplifier circuit 404b form a balancing circuit. That is, as illustrated in FIG. 24, a current value I3 and current value I4 flowing in the antenna 402 become substantially equal values. As a result, the power supply apparatus 4000 suppresses unwanted radiation of an electric field arising by an electric field arising due to a current of the current value I3 flowing in the antenna 402 and an electric field arising due to a current of the current value I4 flowing in the antenna 402 canceling each other out.

Furthermore, similarly to the drive circuit 8 according to one or more embodiments of the fifth example of the present invention, the first drive circuit 408a and the second drive circuit 408b respectively have the inductance L1 set so the resonant frequency fr is greater than the drive frequency fd and no more than 3.7 times the drive frequency fd.

Furthermore, other configurations of the power supply apparatus 4000 according to one or more embodiments of the seventh example of the present invention are similar to the power supply apparatus 1000 in one or more embodiments of the fifth example of the present invention.

Effects of Seventh Embodiment

Effects such as below can be obtained in one or more embodiments of the seventh example of the present invention.

In one or more embodiments of the seventh example of the present invention, as above, the power supply apparatus 4000 comprises the first amplifier circuit 404a and the second amplifier circuit 404b and the first compensation circuit 405a and the second compensation circuit 405b. Moreover, the first amplifier circuit 404a and the second amplifier circuit 404b and the first compensation circuit 405a and the second compensation circuit 405b are configured as a differential amplifier circuit. By this, a circuit formed by the first amplifier circuit 404a and the second amplifier circuit 404b, the first compensation circuit 405a and the second compensation circuit 405b, and the antenna 402 becomes a balancing circuit; therefore, unwanted electric field radiation arising from the power supply coils 421 to 423 can be suppressed.

Furthermore, other effects of the power supply apparatus 4000 according to one or more embodiments of the seventh example of the present invention are similar to the power supply apparatus 1000 in one or more embodiments of the fifth example of the present invention.

MODIFIED EXAMPLES

Embodiments disclosed herein are examples on all counts and should not be considered limiting. The scope of the present invention is indicated not by the description of the embodiments given above but by the scope of patent claims and further includes meanings equivalent to the scope of patent claims and all modifications (modified examples) within the scope.

For example, in one or more embodiments of the fifth to seventh examples of the present invention, an example is illustrated of using an FET as a switching element having a parasitic capacitance, but the present invention is not limited thereto. That is, a switching element other than an FET may be used as long as it is a switching element having a parasitic capacitance.

Furthermore, in one or more embodiments of the fifth to seventh examples of the present invention, drive frequencies, resonant frequencies, and inductances of compensation circuits are described with numerical value examples, but the present invention is not limited to these numerical value examples. That is, the drive frequencies, the resonant frequencies, and the inductances of the compensation circuits may be set using numerical values other than the numerical value examples given above as long as the inductances are set so the resonant frequencies are greater than the drive frequencies and no more than 3.7 times the drive frequencies.

Furthermore, in one or more embodiments of the sixth example of the present invention, an example is illustrated of a configuration of two inductors and two switches to a compensation circuit, but the present invention is not limited thereto. That is, a compensation circuit may comprise three or more inductors and three or more switches.

Furthermore, in one or more embodiments of the sixth example of the present invention, for the sake of convenience, the processing of the controller according to one or more embodiments of the present invention is described using a flowchart of a flow-driven type where the processing is performed in order along a processing flow, but the present invention is not limited thereto. In one or more embodiments of the present invention, a processing operation of a controller may be performed by processing of an event-driven type where processing is executed by event. In this situation, the processing may be completely event-driven or a combination of event driving and flow driving.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims

EXPLANATION OF REFERENCES

2, 602 Power supply antenna (power supply unit)
3 Power source
4, 304, 404, 604 Controller
5 Communication unit
6, 306, 706 Storage
7, 607 Power measurement unit (power acquisition unit)
100, 300, 400, 600, 700 Power supply apparatus
200, 500 Power receiving apparatus
200*a* PC (power receiving apparatus)
200*b* Smartphone (power receiving apparatus)
200*c* Multifunctional watch (power receiving apparatus)
308 Impedance measurement unit
401 Display (notification unit)
2*a*, 402 Antenna (power supply antenna, resonant circuit)
4*a*, 304*a* Amplifier circuit
5*a*, 305*a* Compensation circuit
6*a*, 406 DC power source (external DC power source)
7*a*, 307, 407 Controller
21*a*, 421 to 423 Power supply coil (power supply antenna)
41 Switching element
51, 451 Inductor
100, 300, 4000 Power supply apparatus
2000 Power receiving apparatus
351*a* First inductor (inductor)
351*b* Second inductor (inductor)
351*c*, 351*d* Switch
404*a* First amplifier circuit (amplifier circuit)
404*b* Second amplifier circuit (amplifier circuit)
405*a* First compensation circuit (compensation circuit)
405*b* Second compensation circuit (compensation circuit)

What is claimed is:

1. A power supply apparatus comprising:
a power supply unit that supplies power from a power source to at least one of a plurality of power receiving apparatuses via wireless power transmission;
a controller;
a power acquisition unit that acquires a power value of the power supplied from the power source to at least one of the plurality of power receiving apparatuses;
a communication unit; and
a storage that stores a plurality of first ID's that identify each of the plurality of power receiving apparatuses,
wherein the controller:
 causes a first power receiving apparatus to stop receiving power from the power supply unit upon detecting a second power receiving apparatus that is not receiving power from the power supply unit,
 causes the power supply unit to supply power from the power source to the second power receiving apparatus,
 causes the power acquisition unit that to acquire a power value of the power supplied from the power source to the second power receiving apparatus, and
 determines whether to continue supplying the power from the power source to the second power receiving apparatus based on the acquired power value,
wherein the controller causes each of the plurality of power receiving apparatuses to operate by a maximum load,
wherein the communication unit sends a maximum load command signal, generated by the controller, to each of the plurality of power receiving apparatuses, and
wherein the maximum load command signal causes the respective power receiving apparatus to operate by the maximum load,
wherein the communication unit receives, from the second power receiving apparatus, a second ID that identifies the second power receiving apparatus, and
wherein when one of the plurality of first ID's is identical to the second ID,
 the communication unit does not send the maximum load command signal to the second power receiving apparatus, and the controller determines whether to continue supplying the power from the power source to the second power receiving apparatus.

2. The power supply apparatus according to claim 1, wherein
the communication unit sends a load disconnect signal, generated by the controller, to the first power receiving apparatus, and
the load disconnect signal causes the first power receiving apparatus to stop receiving power from the power supply unit.

3. The power supply apparatus according to claim 2, wherein the communication unit sends the load disconnect signal upon receiving a connection establishment request from the second power receiving apparatus.

4. The power supply apparatus according to any of claim 1, wherein the controller determines to continue supplying the power from the power source to the second power receiving apparatus based on the acquired power value being equal to or less than maximum power that can be supplied from the power supply apparatus.

5. The power supply apparatus according to claim 1, wherein the controller causes the power supply unit to supply power from the power source to the first power receiving apparatus when the second power receiving apparatus does not receive power from the power source, and to determines to continue supplying the power from the power source to the second power receiving apparatus based on a total value of the acquired power values of the power supplied to the first power receiving apparatus and the second power receiving apparatus being equal to or less than maximum power that can be supplied from the power supply apparatus.

6. The power supply apparatus according claim 1, wherein
the communication unit receives power category information from the second power receiving apparatus, and
the power category information indicates power consumption corresponding to a category of the second power receiving apparatus.

7. The power supply apparatus according to claim 6, wherein
the plurality of power receiving apparatuses further comprises at least one more first power receiving apparatus,
the communication unit sends the load disconnect signal to the at least one more first power receiving apparatus, and
when a total of the power supplied to the at least one more first power receiving apparatus is equal to or greater than the power consumption corresponding to the category of the second power receiving apparatus, the power acquisition unit acquires the power value of the power from the power source to the second power receiving apparatus.

8. The power supply apparatus according to claim 6, wherein
the plurality of power receiving apparatuses further comprises at least one more first power receiving apparatus,
the communication unit sends the load disconnect signal to each of the first power receiving apparatuses, and
the power acquisition unit acquires the power value of the power from the power source to the second power receiving apparatus after the communication unit sends the load disconnect signal.

9. The power supply apparatus according to claim 1, wherein the power acquisition unit acquires the power value of the power from the power source to each of the plurality of power receiving apparatuses operated by the maximum load.

10. The power supply apparatus according to claim 1, further comprising:
an impedance measurement unit that measures an impedance of the power supply unit, wherein,
the storage stores one of the plurality of first ID's associated with first impedance measured when the power has been supplied to one of the plurality of power receiving apparatuses.

11. The power supply apparatus according to claim 10, wherein
when a change amount of the measured impedance is greater than a first threshold, the communication unit sends the maximum load command signal to the second power receiving apparatus, and
the change amount is a change from the first impedance to second impedance measured when the communication unit receives the second ID.

12. The power supply apparatus according to claim 10, wherein
when a change amount of the power supplied from the power source is greater than a third threshold, the communication unit sends the maximum load command signal to the second power receiving apparatus, and
the change amount of the power is a change from power supplied to one of the plurality of power receiving apparatuses corresponding to the plurality of first ID's to power supplied to the second power receiving apparatus corresponding to the second ID.

13. A power supply method comprising:
supplying power from a power source to at least one of a plurality of power receiving apparatuses via wireless power transmission;
causing a first power receiving apparatus to stop receiving power from the power source upon detecting a second power receiving apparatus that is not receiving power from the power source;
supplying power form the power source to the second power receiving apparatus;
acquiring a power value of the power supplied from the power source to the second power receiving apparatus;
determining whether to continue supplying the power from the power source to the second power receiving apparatus based on the acquired power value;
causing each of the plurality of power receiving apparatuses to operate by a maximum load;
sending, to each of the plurality of power receiving apparatuses, a maximum load command signal that causes the respective power receiving apparatus to operate by the maximum load;
storing a plurality of first ID's that identify each of the plurality of power receiving apparatuses; and
receiving, from the second power receiving apparatus, a second ID that identifies the second power receiving apparatus,
wherein when one of the plurality of first ID's is identical to the second ID,
not sending the maximum load command signal to the second power receiving apparatus, and
determining whether to continue supplying the power from the power source to the second power receiving apparatus.

14. The power supply method according to claim 13, further comprising:

sending a load disconnect signal to the first power receiving apparatus, the load disconnect signal causing the first power receiving apparatus to stop receiving power from the power source.

15. The power supply method according to claim 13, further comprising:

supplying power from the power source to the first power receiving apparatus when the second power receiving apparatus does not receive power from the power source, and determining to continue supplying the power from the power source to the second power receiving apparatus based on a total value of the acquired power values of the power supplied to the first power receiving apparatus and the second power receiving apparatus being equal to or less than maximum power that can be supplied from the power source.

* * * * *